US011378406B2

(12) United States Patent
Kato

(10) Patent No.: US 11,378,406 B2
(45) Date of Patent: Jul. 5, 2022

(54) DETERMINATION DEVICE, DETERMINATION METHOD AND PROGRAM

(71) Applicant: PIONEER CORPORATION, Tokyo (JP)

(72) Inventor: Masahiro Kato, Kawagoe (JP)

(73) Assignee: PIONEER CORPORATION, Tokyo (JP)

( * ) Notice: Subject to any disclaimer, the term of this patent is extended or adjusted under 35 U.S.C. 154(b) by 340 days.

(21) Appl. No.: 16/499,135

(22) PCT Filed: Mar. 30, 2018

(86) PCT No.: PCT/JP2018/013813
§ 371 (c)(1),
(2) Date: Sep. 27, 2019

(87) PCT Pub. No.: WO2018/181974
PCT Pub. Date: Oct. 4, 2018

(65) Prior Publication Data
US 2020/0041285 A1 Feb. 6, 2020

(30) Foreign Application Priority Data

Mar. 30, 2017 (JP) .............................. JP2017-067410
May 16, 2017 (JP) .............................. JP2017-097380

(51) Int. Cl.
*G01C 21/32* (2006.01)
*G09B 29/00* (2006.01)
(52) U.S. Cl.
CPC ........... *G01C 21/32* (2013.01); *G09B 29/003* (2013.01)
(58) Field of Classification Search
CPC ............................. G01C 21/32; G09B 29/003
(Continued)

(56) References Cited

U.S. PATENT DOCUMENTS 9,014,970 B2 * 4/2015 Oi .............................. G06T 3/20
701/450
2007/0250263 A1 * 10/2007 Yamada ................. B60Q 1/085
701/408
(Continued)

FOREIGN PATENT DOCUMENTS

JP         2007290505 A       11/2007
JP         2010-223901 A      10/2010
(Continued)

OTHER PUBLICATIONS

International Search Report for related International Application No. PCT/JP2018/013813, dated Jul. 3, 2018; 1 page.
(Continued)

*Primary Examiner* — Peter D Nolan
*Assistant Examiner* — Luke Huynh
(74) *Attorney, Agent, or Firm* — Procopio, Cory, Hargreaves & Savitch LLP

(57) ABSTRACT

The determination device acquires a first distance information measured by a measurement unit and indicating a distance from a movable body to an object, and a second distance information estimated by an estimation unit and indicating the distance from the movable body to the object. Also, the determination device acquires own position accuracy information of the movable body. Then, the determination device determines presence or absence of deviation larger than a predetermined value between a position of the object in map information and the position of the object in real environment, based on a difference value of the distances indicated by the first distance information and the second distance information and the own position accuracy information.

11 Claims, 13 Drawing Sheets

(58) Field of Classification Search
USPC .......................................................... 701/450
See application file for complete search history.

(56) References Cited

U.S. PATENT DOCUMENTS

2014/0157175 A1    6/2014  Johansson et al.
2014/0379254 A1*  12/2014  Miksa ................ G01C 21/3811
                                                           701/450

FOREIGN PATENT DOCUMENTS

| JP | 2011-027595 A | 2/2011 |
| JP | 2013-156825 A | 8/2013 |
| JP | 2016-156973 A | 9/2016 |

OTHER PUBLICATIONS

European Search Report for related EP App. No. 18774216.8 dated Nov. 16, 2020; 7 pages.

* cited by examiner

DETERMINATION DEVICE, DETERMINATION METHOD AND PROGRAM

CROSS-REFERENCE TO RELATED APPLICATIONS

This application is a U.S. National Stage entry of PCT Application No: PCT/JP2018/013813 filed Mar. 30, 2018, which claims priority to Japanese Patent Application No. 2017-067410, filed Mar. 30, 2017 and No. 2017-097380, filed May 16, 2017, the contents of which are incorporated herein by reference.

TECHNICAL FIELD

The present invention relates to a technique of correcting positions of features in map data.

BACKGROUND TECHNIQUE

There is proposed a method of updating map data based on peripheral information detected by external sensors loaded on a vehicle. For example, Patent Reference 1 discloses a method of generating change point candidate data by comparing the peripheral information based on the outputs of the sensor units with a partial map database, and updating the map data in consideration of accuracy of the sensors when the change point candidate data is acquired.

PRIOR ART REFERENCES

Patent References

Patent Reference 1: Japanese Patent Application Laid-Open under No. 2016-156973

SUMMARY OF THE INVENTION

Problem to be Solved by the Invention

The map data stored in a server includes position coordinates of the features. If the position coordinates of the feature are changed due to some causes after measuring the position coordinates of the feature, the position coordinates of the feature in the map data do not coincide with the actual position coordinates of the feature. For example, if the position of a road sign is deviated due to collision by a vehicle or an on-ground installation is moved, the actual position of the feature does not coincide with the position in the map data. If the own vehicle position of the vehicle is estimated using the position coordinates of the feature in the map data in this state, estimation error becomes large, and it may cause problems in a driving support or an autonomous driving.

The above is an example of the problem to be solved by the present invention. It is an object of the present invention to detect that the actual position of the feature does not coincide with the position in the map data, and correct the map data if necessary.

Means for Solving the Problem

An invention described in claims is a determination device comprising: a first acquisition unit configured to acquire a first distance information measured by a measurement unit and indicating a distance from a movable body to an object, and a second distance information estimated by an estimation unit and indicating the distance from the movable body to the object; a second acquisition unit configured to acquire own position accuracy information of the movable body; and a determination unit configured to determine presence or absence of deviation larger than a predetermined value between a position of the object in map information and the position of the object in real environment, based on a difference value of the distances indicated by the first distance information and the second distance information and the own position accuracy information.

Another invention described in claims is a determination method executed by a determination device comprising: a first acquisition process to acquire a first distance information measured by a measurement unit and indicating a distance from a movable body to an object, and a second distance information estimated by an estimation unit and indicating the distance from the movable body to the object; a second acquisition process to acquire own position accuracy information of the movable body; and a determination process to determine presence or absence of deviation larger than a predetermined value between a position of the object in map information and the position of the object in real environment, based on a difference value of the distances indicated by the first distance information and the second distance information and the own position accuracy information.

Still another invention described in claims is a program executed by a determination device including a computer, the program causing the computer to function as: a first acquisition unit configured to acquire a first distance information measured by a measurement unit and indicating a distance from a movable body to an object, and a second distance information estimated by an estimation unit and indicating the distance from the movable body to the object; a second acquisition unit configured to acquire own position accuracy information of the movable body; and a determination unit configured to determine presence or absence of deviation larger than a predetermined value between a position of the object in map information and the position of the object in real environment, based on a difference value of the distances indicated by the first distance information and the second distance information and the own position accuracy information.

Still another invention described in claims is a determination device comprising: a first acquisition unit configured to acquire a first distance information measured by a measurement unit and indicating a distance from a movable body to an object, and a second distance information estimated by an estimation unit and indicating the distance from the movable body to the object; a second acquisition unit configured to acquire own position accuracy information of the movable body; and a determination unit configured to determine presence or absence of deviation larger than a predetermined value between a position of the object in map information and the position of the object based on the first distance information, based on a difference value of the distances indicated by the first distance information and the second distance information and the own position accuracy information.

DETAILED DESCRIPTION OF THE PREFERRED EMBODIMENTS

Figure 1:
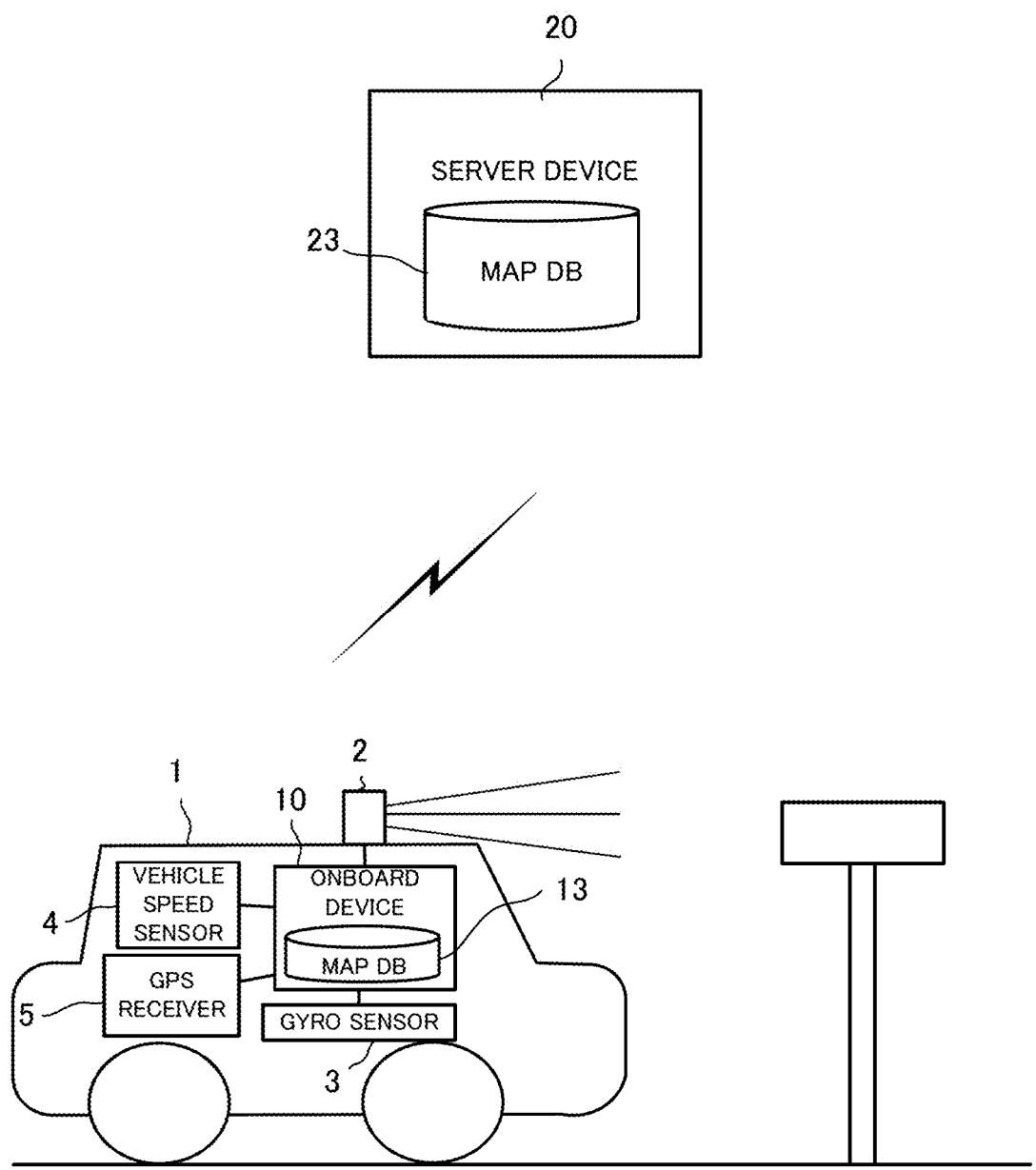
FIG. 1 is a diagram illustrating a schematic configuration of a driving support system.

According to one aspect of the present invention, there is provided a determination device comprising: a first acquisition unit configured to acquire a first distance information measured by a measurement unit and indicating a distance from a movable body to an object, and a second distance information estimated by an estimation unit and indicating the distance from the movable body to the object; a second acquisition unit configured to acquire own position accuracy information of the movable body; and a determination unit configured to determine presence or absence of deviation larger than a predetermined value between a position of the object in map information and the position of the object in real environment, based on a difference value of the distances indicated by the first distance information and the second distance information and the own position accuracy information.

The above determination device acquires a first distance information measured by a measurement unit and indicating a distance from a movable body to an object, and a second distance information estimated by an estimation unit and indicating the distance from the movable body to the object. Also, the determination device acquires own position accuracy information of the movable body. Then, the determination device determines presence or absence of deviation larger than a predetermined value between a position of the object in map information and the position of the object in real environment, based on a difference value of the distances indicated by the first distance information and the second distance information and the own position accuracy information. By the above determination device, it is possible to determine the presence or absence of the deviation between the position of the object in the map information and the actual position of the object measured by the measurement unit.

In one mode of the above determination device, the second acquisition unit further acquires measurement accuracy information of the measurement unit, and the determination unit determines the presence or the absence of the deviation larger than the predetermined value based on the own position accuracy information and the measurement accuracy information. In this mode, the deviation of the positions of the object is determined in consideration of the measurement accuracy of the measurement unit.

Another mode of the above determination device comprises: a third acquisition unit configured to acquire error information including the difference value, the own position accuracy information and the measurement accuracy information for the object which is determined to have the deviation larger than the predetermined value; and a correction unit configured to correct the position of the object in the map information by statistic processing of the difference values included in the acquired error information when the third acquisition unit acquires the error information of more than a predetermined number for an identical object. In this mode, by the statistic processing of the difference values included in the error information, the position of the object in the map data can be corrected.

In still another mode of the above determination device, the correction unit converts the difference values from a movable body coordinate system to a map coordinate system to correct the position in the map information.

In still another mode of the above determination device, the correction unit lowers a level of the own position accuracy information assigned to the object in the map information when variation of the difference values included in the acquired error information is larger than a predetermined value, in a case where the third acquisition unit acquires the error information from vehicles of more than the predetermined number for the identical object. In this mode, information indicating low position accuracy is assigned to the object in the map information.

In still another mode of the above determination device, the determination device is loaded on a vehicle, and the determination device further comprises a transmission unit configured to transmit the error information including the difference value, the own position estimation accuracy information and the measurement accuracy information to an external server, when the determination unit determines the presence of the deviation larger than the predetermined value. In this mode, when it is determined that the positions of the object has the deviation larger than the predetermined value, the error information is transmitted to the server.

In still another mode of the determination device, the transmission unit transmits plural error information or information obtained by using the plural error information to the external server when a variance value based on the plural error information is smaller than a predetermined value, in a case where the third acquisition unit acquires the plural error information for the identical object. In this mode, since the error information is transmitted only when it is highly possible that the position of the feature is deviated, the frequency of transmitting data can be reduced.

In still another mode of the above determination device, the error information includes date and time information and identification information of the object. In this mode, based on the date and time information, it becomes possible to know when the deviation of the feature position is caused.

In still another mode of the above determination device, the measurement unit and the estimation unit are loaded on a vehicle, the determination device is provided in a server, and the first acquisition unit acquires the first distance information and the second distance information from the vehicle. In this mode, the determination device provided in the server can determine the positional deviation of the object based on the information acquired from the vehicle.

According to another aspect of the present invention, there is provided a determination method executed by a determination device comprising: a first acquisition process to acquire a first distance information measured by a measurement unit and indicating a distance from a movable body to an object, and a second distance information estimated by an estimation unit and indicating the distance from the movable body to the object; a second acquisition process to acquire own position accuracy information of the movable body; and a determination process to determine presence or absence of deviation larger than a predetermined value between a position of the object in map information and the position of the object in real environment, based on a difference value of the distances indicated by the first distance information and the second distance information and the own position accuracy information. By this method, it is possible to determine the presence or absence of the position of the object in the map information and the actual position of the object measured by the measurement unit.

According to still another aspect of the present invention, there is provided a program executed by a determination device including a computer, the program causing the computer to function as: a first acquisition unit configured to acquire a first distance information measured by a measurement unit and indicating a distance from a movable body to an object, and a second distance information estimated by an estimation unit and indicating the distance from the movable body to the object; a second acquisition unit configured to acquire own position accuracy information of the movable body; and a determination unit configured to determine presence or absence of deviation larger than a predetermined value between a position of the object in map information and the position of the object in real environment, based on a difference value of the distances indicated by the first distance information and the second distance information and the own position accuracy information. By executing the program by the computer, the above determination device can be realized. This program may be handled in a manner stored in a storage medium.

According to still another aspect of the present invention, there is provided a determination device comprising: a first acquisition unit configured to acquire a first distance information measured by a measurement unit and indicating a distance from a movable body to an object, and a second distance information estimated by an estimation unit and indicating the distance from the movable body to the object; a second acquisition unit configured to acquire own position accuracy information of the movable body; and a determination unit configured to determine presence or absence of deviation larger than a predetermined value between a position of the object in map information and the position of the object based on the first distance information, based on a difference value of the distances indicated by the first distance information and the second distance information and the own position accuracy information.

The above determination device acquires a first distance information measured by a measurement unit and indicating a distance from a movable body to an object, and a second distance information estimated by an estimation unit and indicating the distance from the movable body to the object. Also, the determination device acquires own position accuracy information of the movable body. Then, the determination device determines presence or absence of deviation larger than a predetermined value between a position of the object in map information and the position of the object based on the first distance information, based on a difference value of the distances indicated by the first distance information and the second distance information and the own position accuracy information. By the above determination device, it is possible to determine the presence or absence of the deviation between the position of the object in the map information and the actual position of the object measured by the measurement unit.

EMBODIMENTS

Preferred embodiments of the present invention will be described below with reference to the attached drawings.

[Schematic Configuration]

FIG. 1 is a schematic configuration diagram of a driving support system according to the embodiments. The driving support system roughly includes an onboard device 10 loaded on a vehicle 1, and a server device 20. The vehicle 1 is loaded with the onboard device 10 for performing control associated with the driving support of the vehicle, a Lidar (Light Detection and Ranging or Laser Illuminated Detection And Ranging) 2, a gyro sensor 3, a vehicle speed sensor 4 and a GPS receiver 5. The server device 20 includes a map database (hereinafter "database" will be expressed as "DB") 23 storing map data. The onboard device 10 and the server device transmit and receive data by wireless communication. While FIG. 1 illustrates one onboard device 10 of one vehicle 1 for convenience, actually the server device 20 communicates with the onboard devices 10 on plural vehicles 1.

The onboard device 10 is electrically connected with the Lidar 2, the gyro sensor 3, the vehicle speed sensor 4 and the GPS receiver 5, and estimates the position of the vehicle (referred to as "own vehicle position") on which the onboard device 10 is loaded based on the outputs of those elements. Then, based on the estimation result of the own vehicle position, the onboard device 10 performs autonomous driving control of the vehicle to guide the vehicle along the route to the set destination. The onboard device 10 includes a map DB 13 which stores road data and feature information which is information related to the features serving as landmarks and provided near the roads. The features serving as landmarks may be kilometer posts, 100 m posts, delineators, traffic infrastructure facilities (e.g., road signs, destination boards, traffic signals), telegraph poles, street lamps, which are periodically provided on the side of the road. The feature information includes feature IDs which are identification information of the features and position and direction information of the features associated with each other. The onboard device collates the feature information with the outputs of the Lidar 2 to estimate the own vehicle position.

The Lidar 2 emits pulse lasers to a predetermined angle range in a horizontal direction and a vertical direction to discretely measure the distance to an object existing in an external field, and generates three-dimensional point group information indicating the position of the object. In this case, the Lidar 2 includes an irradiation unit which irradiates the laser light with changing the irradiation direction, a light receiving unit which receives the reflected light (scattering light) of the irradiated laser light, and an output unit which outputs scan data based on the light receiving signal outputted by the light receiving unit. The scan data is generated based on the irradiation direction corresponding to the laser light received by the light receiving unit and the response delay time of the laser light specified based on the light receiving signal. In the embodiments, the Lidar 2 is mounted toward the traveling direction of the vehicle so as to scan at least the forward area of the vehicle. The Lidar 2, the gyro sensor 3, the vehicle speed sensor 4 and the GPS receiver supply the output data to the onboard device 10, respectively.

Figure 2:
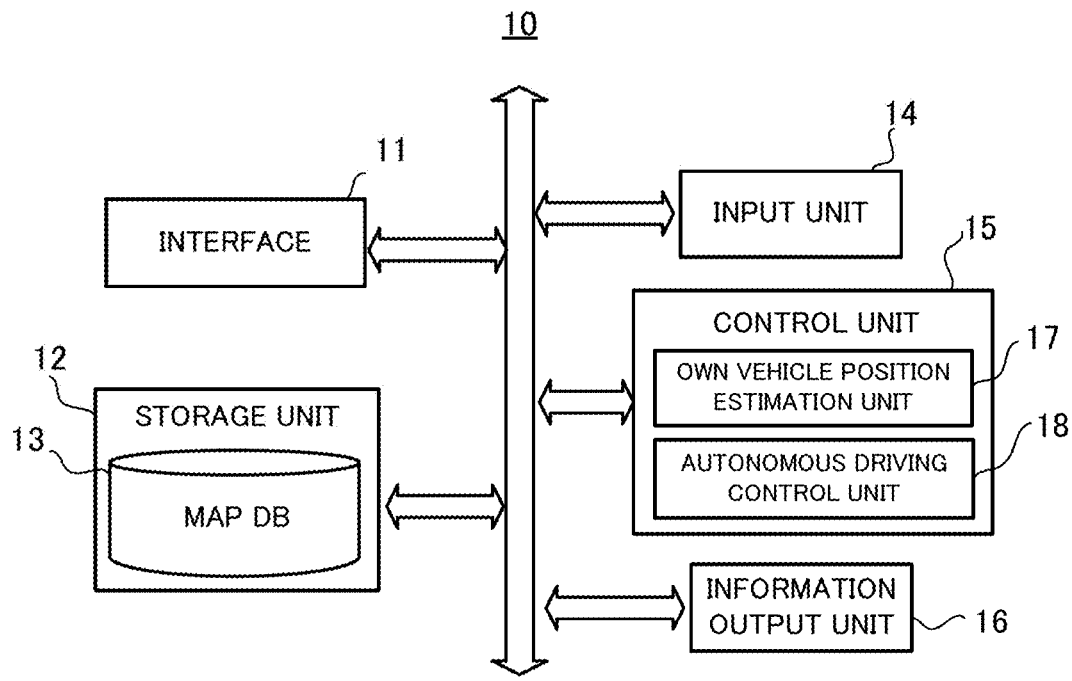
FIG. 2 is a block diagram illustrating a functional configuration of an onboard device.

FIG. 2 is a block diagram illustrating a functional configuration of the onboard device 10. The onboard device 10 mainly includes an interface 11, a storage unit 12, an input unit 14, a control unit 15 and an information output unit 16. These elements are connected with each other by a bus line.

The interface 11 acquires the output data from the sensors such as the Lidar 2, the gyro sensor 3, the vehicle speed sensor 4 and the GPS receiver 5, and supplies them to the control unit 15. Also, the interface 11 supplies the signals associated with the driving control of the vehicle, which is generated by the control unit 15, to an ECU (Electronic Control Unit) of the vehicle.

The storage unit 12 stores programs executed by the control unit and information necessary for the control unit 15 to execute predetermined processing. In the embodiments, the storage unit 12 stores the map DB 13 including feature information. The feature information includes information of the feature associated with each feature, and includes the feature ID which is the identification information of the feature, the position information and the shape information. The position information indicates the absolute position of the feature expressed by the latitude and the longitude (and the altitude). The shape information is information related to the shape of the feature, and includes the normal information indicating the direction of the feature (i.e., the normal direction with respect to the front), and the size information indicating the size of the feature. The map DB 13 may be regularly updated. In that case, for example, the control unit 15 receives partial map information related to the area where the own vehicle position belongs to, from the server device 20 managing the map information via a communication unit not shown, and reflects the partial map information to the map DB 13.

The input unit 14 may be buttons, a touch panel, a remote controller or a voice input device to be operated by a user, and receives an input to designate a destination for the route search or an input designating ON or OFF of the autonomous driving. The information output unit 16 may be a display or a speaker for outputting information based on the control by the control unit 15.

The control unit 15 includes a CPU for executing programs, and controls the entire onboard device 10. In the embodiments, the control unit 15 includes an own vehicle position estimation unit 17, and an autonomous driving control unit 18. The own vehicle position estimation unit 17 corrects the own vehicle position estimated from the output data of the gyro sensor 3, the vehicle speed sensor 4 and/or the GPS receiver 5 based on the measurement values of the distance and the angle with respect to the feature measured by the Lidar 2 and the position information of the feature extracted from the map DB 13. In the embodiments, as an example, the own vehicle position estimation unit 17 alternately executes a prediction step of estimating the own vehicle position from the output data of the gyro sensor 3 and the vehicle speed sensor 4, etc., by a state estimation method based on Bayesian inference, and a measurement updating step of correcting the estimated value of the own vehicle position calculated in the preceding prediction step.

The autonomous driving control unit 18 refers to the map DB 13, and transmits signals necessary for the autonomous driving control to the vehicle based on the set route and the own vehicle position estimated by the own vehicle position estimation unit 17. The autonomous driving control unit 18 sets a target track based on the set route, and controls the position of the vehicle by transmitting the guide signal to the vehicle such that the own vehicle position estimated by the own vehicle position estimation unit 17 stays within a deviation width smaller than a predetermined width from the target track.

In the above configuration, the Lidar 2 is an example of the measurement unit of the present invention, and the control unit 15 is an example of the estimation unit, the first acquisition unit, the second acquisition unit and the determination unit of the present invention.

Figure 3:
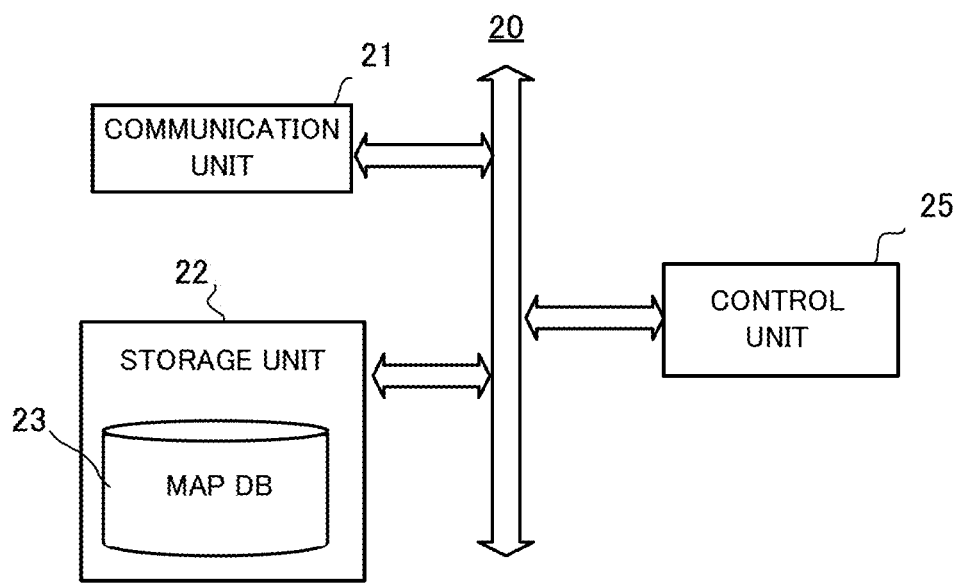
FIG. 3 is a block diagram illustrating a functional configuration of a server device.

FIG. 3 is a block diagram illustrating a functional configuration of the server device 20. The server device 20 mainly includes a communication unit 21, a storage unit 22 and a control unit 25. These elements are connected with each other via a bus line. The communication unit 21 communicates with the onboard device 10 by wireless communication. The storage unit 22 stores programs to be executed by the control unit 25 and information necessary for the control unit 25 to execute predetermined processing. Also, the storage unit 22 stores a map DB 23 including the feature information. The control unit 25 includes a CPU for executing programs, and controls the entire server device 20. Specifically, the control unit 25 executes map correction processing described later.

1st Embodiment (Own Vehicle Position Estimation Processing)

Next, a first embodiment of the estimation processing of the own vehicle position by the own vehicle position estimation unit 17 will be described. The own vehicle position estimation unit 17 successively repeats the prediction step and the measurement updating step to perform the own vehicle position estimation. The state estimation filter used in those steps may be various filters developed to perform the Bayesian inference, for example, an extended Kalman filter, an unscented Kalman filter and a particle filter. Thus, as the position estimation based on the Bayesian inference, various method are proposed. In the following, as an example, the own vehicle position estimation using the extended Kalman filter will be briefly described.

Figure 4:
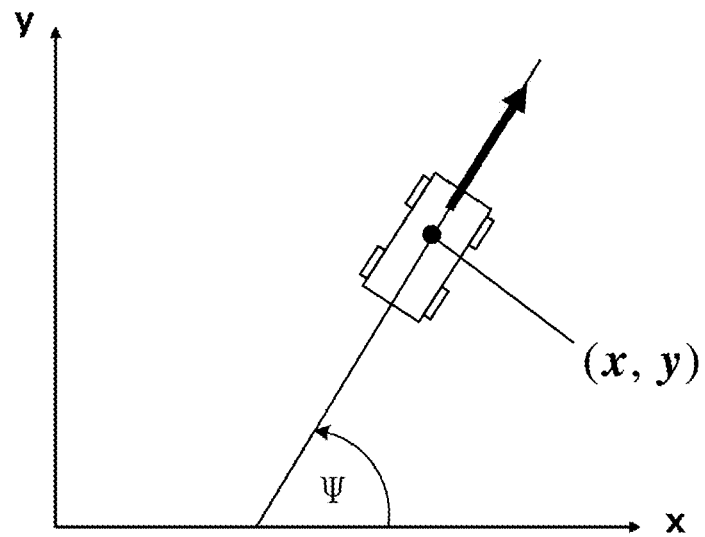
FIG. 4 is a diagram expressing a state variable vector on two-dimensional rectangular coordinates.

FIG. 4 is a diagram expressing a state variable vector X on two-dimensional rectangular coordinates. In the first embodiment, the z-coordinate is projected on the xy-two-dimensional rectangular coordinates. As shown in FIG. 4, the own vehicle position on the plane defined on the xy-two-dimensional rectangular coordinates is expressed by the coordinates "(x,y)" and the azimuth "$\Psi$" of the own vehicle. Here, the azimuth $\Psi$ is defined as an angle formed by the traveling direction of the vehicle and the x-axis. The coordinates (x,y) indicate an absolute position corresponding to the combination of the latitude and the longitude, for example.

Figure 5:
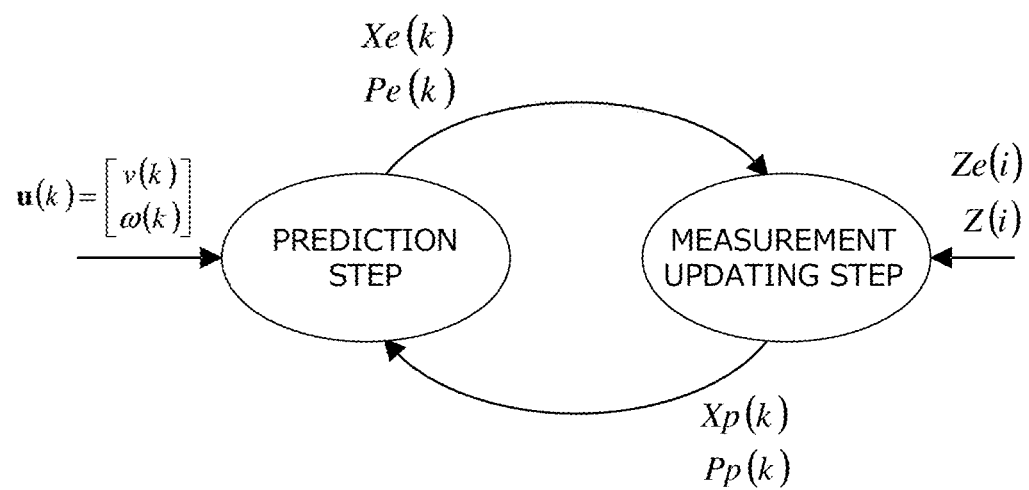
FIG. 5 is a diagram illustrating a schematic relation of a prediction step and a measurement updating step.

FIG. 5 is a diagram illustrating a schematic relation of the prediction step and the measurement updating step. As shown in FIG. 5, by repeating the prediction step and the measurement updating step, calculation and updating of the estimated value of the state variable vector X are successively performed. Here, the state variable vector of the reference time (i.e., current time) "k" subjected to the calculation is expressed as "Xe(k)" or "Xp(k)". It is noted that a subscript "e" is put to the provisional prediction value predicted by the prediction step, and a subscript "p" is put to the high-accuracy estimation value updated by the measurement updating step. ("The state variable vector $Xe(k)=(x_e(k), y_e(k), \Psi_e(k))^T$", and "the state variable vector $Xp(k)=(x_p(k), y_p(k), \Psi_p(k))^T$")

In the prediction step, the own vehicle position estimation unit 17 calculates the prediction value (hereinafter referred to as "predicted own vehicle position") $Xe(k)$ of the own vehicle position at the time k, by making the moving speed "v" of the vehicle and the yaw angular velocity "ω" around the z-axis (these two will be hereinafter referred to as "control value u(k)") operate on the state variable vector $Xp(k-1)$ at the time (k-1) calculated in the preceding measurement updating step. At the same time, the own vehicle position estimation unit 17 calculates the covariance matrix $Pe(k)$ corresponding to the error distribution of the predicted own vehicle position $Xe(k)$ from the covariance matrix $Pp(k-1)$ at the time (k-1) calculated in the preceding measurement updating step.

In the measurement updating step, the own vehicle position estimation unit 17 associates the position vector of the features registered in the map DB 13 and the scan data of the Lidar 2. Then, when they are associated, the own vehicle position estimation unit 17 acquires the measurement value (hereinafter referred to as "feature measurement value") "Z(i)" of the associated feature by the Lidar 2 and the prediction value (hereinafter referred to as "feature prediction value") "Ze(i)" of the feature acquired by modelling the measurement processing by the Lidar 2 using the predicted own vehicle position $Xe(k)$ and the position vector of the feature registered in the map DB 13, respectively. The feature measurement value $Z(i)$ is a two-dimensional vector obtained by converting the distance and the scan angle of the feature measured by the Lidar 2 at the time i to the components on the axes in the traveling direction and the lateral direction of the vehicle. Then, the own vehicle position estimation unit 17 calculates the difference value of the feature measurement value $Z(i)$ and the feature prediction value $Ze(i)$ as shown by the following equation (1).

$$\text{DIFFERENCE VALUE} = Z(i) - Ze(i) = \begin{bmatrix} dx \\ dy \end{bmatrix} \quad (1)$$

Also, as shown by the following equation (2), the own vehicle position estimation unit 17 multiplies the difference value of the feature measurement value $Z(i)$ and the feature prediction value $Ze(i)$ by the Kalman gain "$K(k)$", and adds the result to the predicted own vehicle position $Xe(k)$ to calculate the state variable vector (hereinafter referred to as "measurement updated own vehicle position") $Xp(k)$ of the updated state.

$$Xp(k)=Xe(k)+K(k)\{Z(i)-Ze(i)\} \quad (2)$$

Also, in the measurement updating step, the own vehicle position estimation unit 17 calculates the covariance matrix $Pp(k)$ corresponding to the error distribution of the measurement updated own vehicle position $Xp(k)$ from the covariance matrix $Pe(k)$, similarly to the prediction step. The parameter such as the Kalman gain $K(k)$ may be calculated in the same manner as a known own position estimation technique using an extended Kalman filter, for example.

When the position vector of the feature registered in the map DB 13 and the scan data by the Lidar 2 can be associated for plural features, the own vehicle position estimation unit 17 may execute the measurement updating step based on an arbitrary selected one feature measurement value, and may execute the measurement updating step for plural times based on all the associated feature measurement values. When the plural feature measurement values are used, the own vehicle position estimation unit 17 considers that the measurement accuracy of the Lidar gets worse as the feature is far from the Lidar 2, and makes the weight for the feature smaller as the distance from the Lidar 2 to the feature is longer. Generally, the long diameter, the short diameter and the angle of the error ellipse indicating the assumed error range (e.g., the range based on 99% reliable section) may be calculated from the eigenvalue and the eigenvector of the covariance matrix corresponding to the above-mentioned error distribution.

In this way, by repeating the prediction step and the measurement updating step to discretely calculate the predicted own vehicle position $Xe(k)$ and the measurement updated own vehicle position $Xp(k)$, the most likely own vehicle position is calculated. The own vehicle position thus calculated will be referred to as "estimated own vehicle position".

In the above description, the feature measurement value is an example of the first distance information of the present invention, the feature prediction value is an example of the second distance information of the present invention, the position estimation accuracy is an example of the own position accuracy information of the present invention, and the Lidar measurement accuracy is an example of the measurement accuracy information of the present invention.

(Feature Position Correction Method)

Next, a method of correcting the position of the feature will be described. In the EKF (Extended Kalman Filter) position estimation by the road signs using the Lidar, as shown in the above equation (2), the own vehicle position is calculated by using the difference value of the feature measurement value and the feature prediction value. As understood from the equation (2), if the difference value indicated by the equation (1) becomes large, the correction amount of the predicted own vehicle position $Xe(k)$ becomes large. Here, the difference value becomes large due to one of the following causes (A) to (C).

(A) The feature measurement value has an error.

For example, this includes the case where the measurement accuracy of the Lidar is low, or the case where the measurement accuracy of the Lidar is not low, but the measurement accuracy becomes low because a moving body such as another vehicle exists between the feature to be measured and the vehicle at the time of the measurement (so-called occlusion).

(B) The estimated own vehicle position used to calculate the feature prediction value is deviated.

This is a case where the error of the predicted own vehicle position $Xe(k)$ or the measurement updated own vehicle position $Xp(k)$ is large.

(C) The position coordinates of the feature in the map data used for calculating the feature prediction value are deviated.

This is the situation where the position of the feature is changed. For example, a road sign which is an example of a feature becomes inclined due to collision by a vehicle, or a structure which is an example of a feature is removed or moved, after the map data is produced. Therefore, the position coordinates of the feature in the map data do not coincide with the actual position coordinates of the feature. Namely, the position of the feature in the map data and the position of the feature in real environment are deviated. Therefore, in this case, it is required to correct the position coordinates of the feature in the map data so as to coincide with the position coordinates of the real feature. In the embodiments, the position of such a feature is corrected in the following method.

Figure 6:
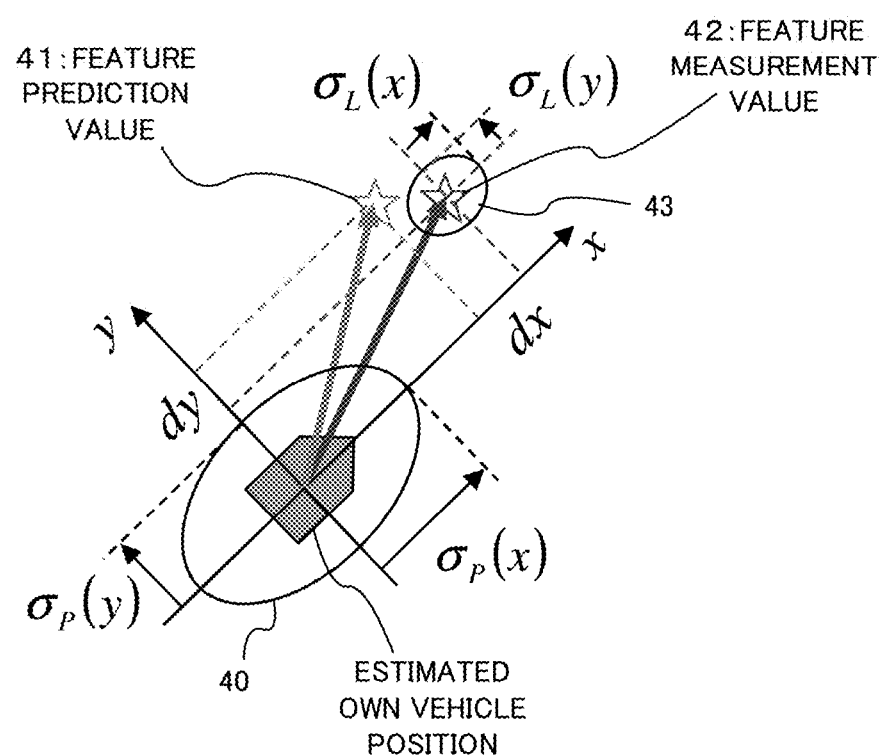
FIG. 6 illustrates a positional relation between a vehicle and a feature at the time of position estimation.

FIG. 6 illustrates a positional relation between the estimated own vehicle position and the feature. The coordinate system shown in FIG. 6 is a body coordinate system based on the vehicle, wherein the x-axis represents the traveling direction of the vehicle and the y-axis represents the direction perpendicular thereto (the left-right direction of the vehicle). In FIG. 6, the estimated own vehicle position has the error range indicated by the error ellipse 40. The error ellipse 40 is defined by the position estimation accuracy $\sigma_P(x)$ in the x-direction and the position estimation accuracy $\sigma_P(y)$ in the y-direction. The position estimation accuracy $\sigma_P$ is obtained by converting the covariance matrix P(k) to the body coordinate system using Jacobian matrix H(i) by the following equation (3).

$$H(i)P(k)H(i)^T = \begin{bmatrix} \sigma_P(x)^2 & Cov(x,y) \\ Cov(x,y) & \sigma_P(y)^2 \end{bmatrix} \quad (3)$$

In the equation (3), $\sigma_P(x)^2$ is the variance in the x-direction, and $\sigma_P(y)^2$ is the variance in the y-direction. As the square roots of them, the position estimation accuracy $\sigma_P(x)$ in the x-direction and the position estimation accuracy $\sigma_P(y)$ in the y-direction are calculated. Thus, the position estimation accuracy $\sigma_P(\sigma_P(x), \sigma_P(y))$ is obtained.

In FIG. 6, the feature prediction value 41 is calculated by modeling the measurement processing by the Lidar 2 by using the predicted own vehicle position Xe(k) and the position vector of the feature registered in the map DB 13. The feature measurement value 42 is the measurement value by the Lidar 2 when the position vector of the feature registered in the map DB 13 and the scan data of the Lidar 2 can be associated with each other. The feature measurement value 42 has the error range indicated by the error ellipse 43. Generally, since the measurement error by the Lidar becomes large in proportion to the square of the distance between the Lidar and the feature to be measured, the Lidar measurement accuracy $\sigma_L(\sigma_L(x), \sigma_L(y))$ is obtained by calculating the error ellipse 43 based on the distance from the estimated own vehicle position to the feature. The difference value between the feature prediction value 41 and the feature measurement value 42 is "dx" in the x-direction and "dy" in the y-direction, as expressed by the equation (1).

Figure 7:
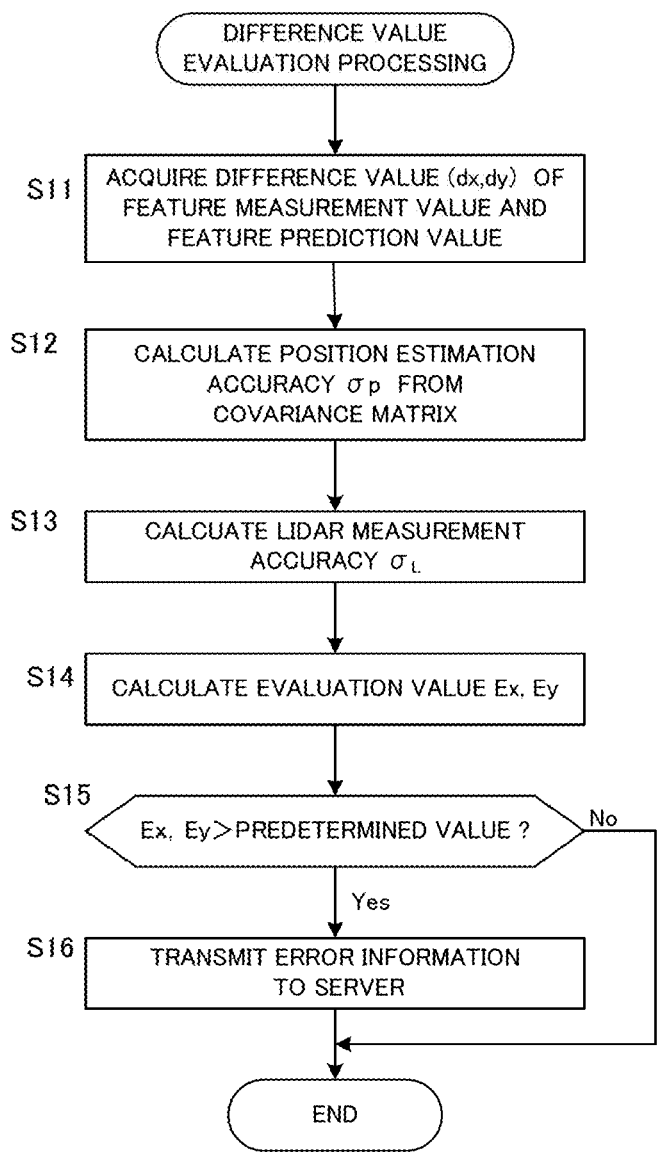
FIG. 7 is a flowchart of difference value evaluation processing according to a first embodiment.

FIG. 7 is a flowchart of the difference value evaluation processing executed by the onboard device 10 of the vehicle 1. This processing is actually performed by the control unit 15 of the onboard device 10 which executes a program prepared in advance. First, the onboard device 10 acquires the difference value (dx, dy) of the feature measurement value 42 and the feature prediction value 41 by the above-mentioned equation (1) (step S11). Next, the onboard device 10 calculates the position estimation accuracy $\sigma_P$ by the equation (3) (step S12). Further, the onboard device calculates the Lidar measurement accuracy $\sigma_L$ based on the distance to the feature (step S13).

When the difference value (dx, dy), the position estimation accuracy $\sigma_P(\sigma_P(x), \sigma_P(y))$ and the Lidar measurement accuracy $\sigma_L(\sigma_L(x), \sigma_L(y))$ are obtained, the onboard device 10 evaluates the difference value using the position estimation accuracy and the Lidar measurement accuracy. Namely, the onboard device 10 examines the ratio of the difference value with respect to the error range of the estimated own vehicle position and the Lidar error range 43, and determines the validity of the difference between the feature measurement value 42 and the feature prediction value 41. Specifically, the onboard device 10 calculates the evaluation values Ex, Ey by the following evaluation equations (4) (step S14).

$$Ex = \frac{|dx|}{\sigma_P(x) + \sigma_L(x)} \quad (4)$$

$$Ey = \frac{|dy|}{\sigma_P(y) + \sigma_L(y)}$$

Next, the onboard device 10 compares the evaluation values Ex, Ey with a predetermined value (step S15). When at least one of the evaluation values Ex, Ey is larger than the predetermined value (step S15: Yes), the onboard device 10 determines that the cause of the large difference value is the above-mentioned (A) or (C), i.e., the cause can be (C). Then, the onboard device 10 transmits the date and time information at that time, the estimated own vehicle position at that time, the feature ID of the object feature, the difference value (dy,dy), the position estimation accuracy $\sigma_P(\sigma_P(x), \sigma_P(y))$ and the Lidar measurement accuracy $\sigma_L(\sigma_L(x), \sigma_L(y))$ to the server device 20 as the error information (step S16). Then, the processing ends. The reason why the date and time information is included in the error information to be transmitted to the server 20 is that, if the actual position coordinates of the feature change due to the environmental change of the feature, the date and time information is important to know when the change occurred.

On the other hand, when both of the evaluation values Ex and Ey are smaller than the predetermined value (step S15: No), the onboard device 10 ends the processing. In case of the above-mentioned (B), the denominators of the evaluation equations (4) are large, and the evaluation values Ex, Ey do not become large even if |dx|, |dy| of the numerator are large. Thus, by the difference value evaluation processing in the onboard device 10, it is detected that the cause of the large difference value may be the above-mentioned (C), and the error information at that time is transmitted to the server device 20.

Figure 8:
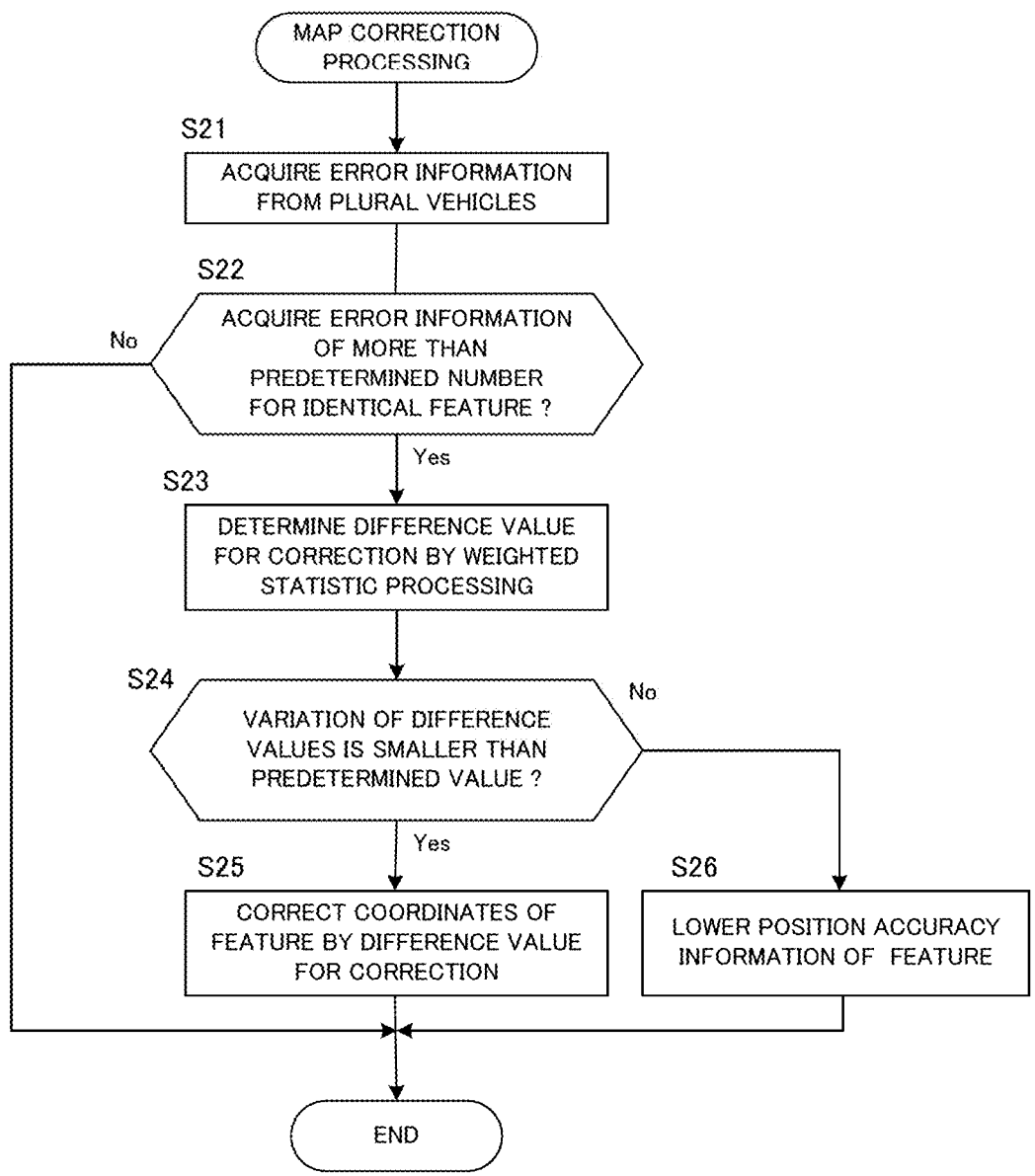
FIG. 8 is a flowchart of map correction processing according to the first embodiment.

Next, map correction processing executed by the server device 20 will be described. FIG. 8 is a flowchart of the map correction processing. This processing is actually performed by the controller 25 of the server device 20, which executes a program prepared in advance. First, the server device 20 acquires the error information from plural vehicles (step S21). Next, the server device 20 determines whether or not it acquired the error information of more than a predetermined number for an identical feature (step S22).

If the server device 20 did not acquire the error information of more than the predetermined number for the identical feature (step S22: No), the server device 20 determines that the cause of the large difference value on the vehicle side is (A), i.e., the difference value accidentally became large by occlusion or the like, and ends the processing.

On the other hand, if the server device 20 acquired the error information of more than the predetermined number for the identical feature (step S22; Yes), the server device 20 determines that the cause of the large difference value on the vehicle side is (C), i.e., the position coordinates of the feature in the map data do not coincide with the actual position coordinates of the feature. Since the difference value is the correction amount in the traveling direction and the left-right direction of the vehicle on the body coordinate system shown in FIG. 6, the server device converts the difference values (dx,dy) included in the error information received from the plural vehicles 10 to the deviation amount on the map coordinate system. Then, the server device 20 determines the difference value for correction, indicating the correction amount of the feature position in the map data, by weighted statistic processing (step S23). Specifically, the server device 20 executes the statistic processing of the difference values by weighting based on the position estimation accuracy $\sigma_P$ and the Lidar measurement accuracy $\sigma_L$ of each vehicle included in the error information received from the onboard devices 10. For example, the server device 20 determines that the error information in which the sum of the position estimation accuracy $\sigma_P$ and the Lidar measurement accuracy $\sigma_L$ is small has high accuracy, and increases the weight for the error information. Thus, the server device 20 determines the difference value for correction.

In the above processing, the server device 20 determines that the cause of the large difference value is (A) if it did not acquire the error information of more than the predetermined number for the identical feature (step S22: No), and determines that the cause of the large difference value is (C) if it acquired the error information of more than the predetermined number for the identical feature (step S22: Yes). However, it is possible that the server device 20 do not determine the cause of the large difference value as (A) or (C). Namely, if the server device 20 did not acquire the error information of more than the predetermined number for the identical feature (step S22: No), the server device 20 may end the processing. If the server device 20 acquired the error information of more than the predetermined number for the identical feature (step S22: Yes), the server device 20 may determine the difference value for correction, indicating the correction amount of the feature position in the map data, by the weighted statistic processing (step S23).

Next, the server device 20 determines whether or not the variation of the difference values is smaller than a predetermined value during calculation of the difference value for correction (step S24). If the variation of the difference values is smaller than the predetermined value (step S24: Yes), the server device corrects the position coordinates of the feature in the map data by the difference value for correction (step S25). Since the difference value for correction is the correction amount in the traveling direction and the left-right direction of the vehicle on the body coordinate system shown in FIG. 6, the server device converts it to the deviation amount on the map coordinate system, and then corrects the position coordinates of the feature in the map data. Thus, based on the error information acquired from plural vehicles, the position coordinates of the feature in the map data are corrected. Since the difference value for correction used here is calculated by the weighted statistic processing of the difference values included in the error information acquired from plural onboard devices 10 by using the position estimation accuracy and the Lidar measurement accuracy, the position coordinates in the map data can be corrected without the influence of the position estimation accuracy and the Lidar measurement accuracy in each onboard device 10.

On the other hand, if the variation of the difference values is not smaller than the predetermined value (step S24: No), it is difficult to accurately determine the correction amount of the position coordinates of the feature in the map data, and the server device 20 lowers the position accuracy information of the feature in the map data (step S26). Namely, the server device 20 assigns, to the feature in the map data, information indicating that the position accuracy is low. Then, the processing ends. Thus, the onboard device 10 can recognize that the position accuracy of the feature is low when using the information of the feature in the map data, the onboard device 10 can use the information of the feature with lower weight or avoid the use of the information in the own vehicle position estimation processing. Actually, such a feature is measured again by a dedicated measurement vehicle or the like. However, by assigning the information indicating that the position accuracy is low, it can be prevented that the onboard device 10 on the vehicle 1 side uses the information of low position accuracy for the driving support or the autonomous driving.

2st Embodiment (Own Vehicle Position Estimation Processing)

Next, a second embodiment of the estimation processing of the own vehicle position by the own vehicle position estimation unit 17 will be described. The own vehicle position estimation unit 17 successively repeats the prediction step and the measurement updating step to perform the own vehicle position estimation. The state estimation filter used in those steps may be various filters developed to perform the Bayesian inference, for example, an extended Kalman filter, an unscented Kalman filter and a particle filter. Thus, as the position estimation based on the Bayesian inference, various method are proposed. In the following, as an example, the own vehicle position estimation using the extended Kalman filter will be briefly described.

Figure 9:
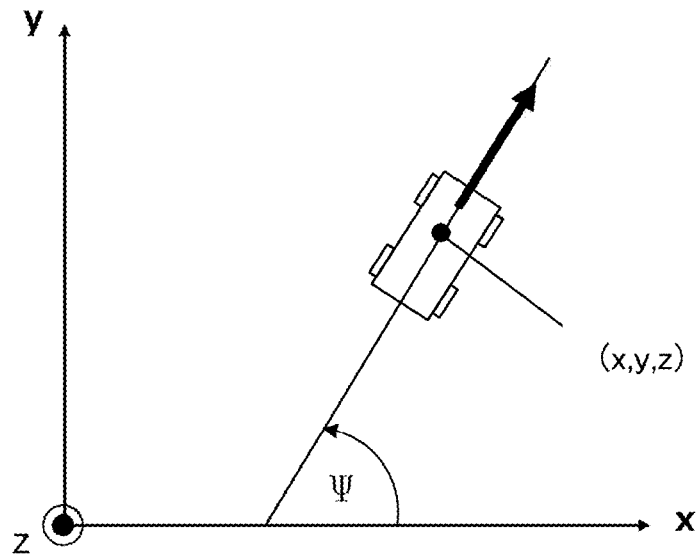
FIG. 9 is a diagram expressing a state variable vector on three-dimensional rectangular coordinates.

FIG. 9 is a diagram expressing a state variable vector X on three-dimensional rectangular coordinates. In the second embodiment, the z-coordinate is taken into consideration. As shown in FIG. 9, the own vehicle position on the plane defined on the xyz-three-dimensional rectangular coordinates is expressed by the coordinates "(x,y,z)" and the azimuth "Ψ" of the own vehicle. Here, the azimuth Ψ is defined as an angle formed by the traveling direction of the vehicle and the x-axis. The coordinates (x,y,z) indicate an absolute position corresponding to the combination of the latitude, the longitude and the altitude, for example. Further, since the road has slope in front-back and left-right directions, the posture has a roll angle ϕ and a pitch angle θ. Therefore, the position and the posture of the vehicle can be defined by 6 variables in total.

Figure 10:
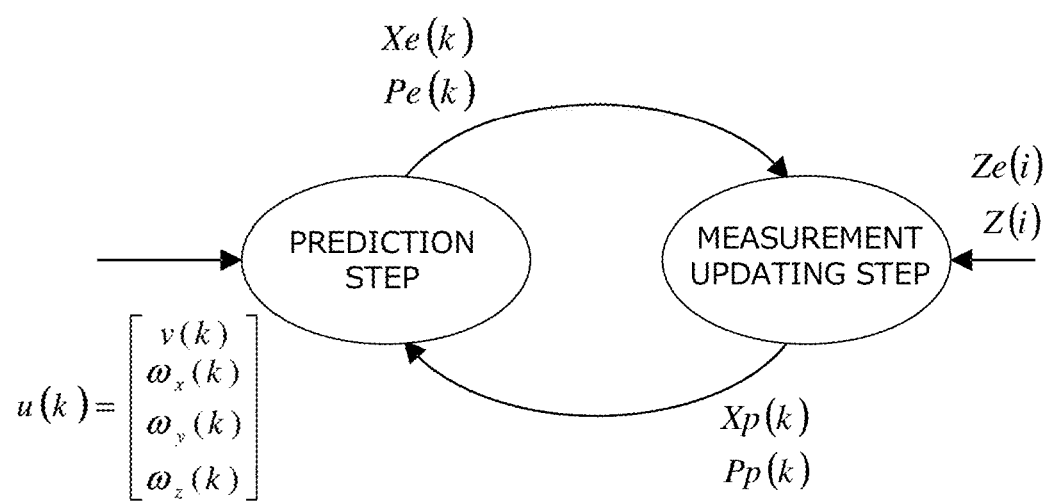
FIG. 10 is a diagram illustrating a schematic relation of the prediction step and the measurement updating step.

FIG. 10 is a diagram illustrating a schematic relation of the prediction step and the measurement updating step. As shown in FIG. 10, by repeating the prediction step and the measurement updating step, calculation and updating of the estimated value of the state variable vector X are successively performed. Here, the state variable vector of the reference time (i.e., current time) "k" subjected to the calculation is expressed as "Xe(k)" or "Xp(k)". It is noted that a subscript "e" is put to the provisional prediction value predicted by the prediction step, and a subscript "p" is put to the high-accuracy estimation value updated by the measurement updating step. ("The state variable vector Xe(k)= $(x_e(k), y_e(k), z_e(k), \phi_e(k), \theta_e(k), \Psi_e(k))^T$", and "the state variable vector Xp(k)=$(x_p(k), y_p(k), z_p(k), \phi_p(k), \theta_p(k), \Psi_p(k))^T$")

In the prediction step, the own vehicle position estimation unit 17 calculates the prediction value (hereinafter referred to as "predicted own vehicle position") Xe(k) of the own vehicle position at the time k, by making the moving speed "v" of the vehicle, the roll angular velocity "$\omega_x$", the pitch angular velocity "$\omega_y$" and the yaw angular velocity "$\omega_z$" (these will be hereinafter referred to as "control value u(k)") operate on the state variable vector Xp(k−1) at the time (k−1) calculated in the preceding measurement updating step. At the same time, the own vehicle position estimation unit 17 calculates the covariance matrix Pe(k) corresponding to the error distribution of the predicted own vehicle position Xe(k) from the covariance matrix Pp(k−1) at the time (k−1) calculated in the preceding measurement updating step.

In the measurement updating step, the own vehicle position estimation unit 17 associates the position vector of the features registered in the map DB 13 and the scan data of the Lidar 2. Then, when they are associated, the own vehicle position estimation unit 17 acquires the measurement value (hereinafter referred to as "feature measurement value") "Z(i)" of the associated feature by the Lidar 2 and the prediction value (hereinafter referred to as "feature prediction value") "Ze(i)" of the feature acquired by modelling the measurement processing by the Lidar 2 using the predicted own vehicle position Xe(k) and the position vector of the feature registered in the map DB 13, respectively. The feature measurement value Z (i) is a three-dimensional vector obtained by converting the distance and the scan angle of the feature measured by the Lidar 2 at the time i to the components on the axes in the traveling direction, the lateral direction and the vertical direction of the vehicle. Then, the own vehicle position estimation unit 17 calculates the difference value of the feature measurement value Z(i) and the feature prediction value Ze(i) as shown by the following equation (5).

$$\text{DIFFERENCE VALUE} = Z(i) - Ze(i) = \begin{bmatrix} dx \\ dy \\ dz \end{bmatrix} \quad (5)$$

Also, as shown by the following equation (6), the own vehicle position estimation unit 17 multiplies the difference value of the feature measurement value Z (i) and the feature prediction value Ze(i) by the Kalman gain, and adds the result to the predicted own vehicle position Xe(k) to calculate the state variable vector (hereinafter referred to as "measurement updated own vehicle position") Xp(k) of the updated state.

$$Xp(k) = Xe(k) + K(k)\{Z(i) - Ze(i)\} \quad (6)$$

Also, in the measurement updating step, the own vehicle position estimation unit 17 calculates the covariance matrix Pp(k) corresponding to the error distribution of the measurement updated own vehicle position Xp(k) from the covariance matrix Pe(k), similarly to the prediction step. The parameter such as the Kalman gain K(k) may be calculated in the same manner as a known own position estimation technique using an extended Kalman filter, for example.

When the position vector of the feature registered in the map DB 13 and the scan data by the Lidar 2 can be associated for plural features, the own vehicle position estimation unit 17 may execute the measurement updating step based on an arbitrary selected one feature measurement value, and may execute the measurement updating step for plural times based on all the associated feature measurement values. When the plural feature measurement values are used, the own vehicle position estimation unit 17 considers that the measurement accuracy of the Lidar gets worse as the feature is far from the Lidar 2, and makes the weight for the feature smaller as the distance from the Lidar 2 to the feature is longer. Generally, the long diameter, the short diameter and the angle of the error ellipse indicating the assumed error range (e.g., the range based on 99% reliable section) may be calculated from the eigenvalue and the eigenvector of the covariance matrix corresponding to the above-mentioned error distribution.

In this way, by repeating the prediction step and the measurement updating step to discretely calculate the predicted own vehicle position Xe(k) and the measurement updated own vehicle position Xp(k), the most likely own vehicle position is determined. The own vehicle position thus calculated will be referred to as "estimated own vehicle position".

In the above description, the feature measurement value is an example of the first distance information of the present invention, the feature prediction value is an example of the second distance information of the present invention, the position estimation accuracy is an example of the own position accuracy information of the present invention, and the Lidar measurement accuracy is an example of the measurement accuracy information of the present invention.

(Feature Position Correction Method)

Next, a method of correcting the position of the feature will be described. In the EKF (Extended Kalman Filter) position estimation by the road signs using the Lidar, as shown in the above equation (6), the own vehicle position is calculated by using the difference value of the feature measurement value and the feature prediction value. As understood from the equation (6), if the difference value indicated by the equation (5) becomes large, the correction amount of the predicted own vehicle position Xe(k) becomes large. Here, the difference value becomes large due to one of the following causes (A) to (C).

(A) The feature measurement value has an error.

For example, this includes the case where the measurement accuracy of the Lidar is low, or the case where the measurement accuracy of the Lidar is not low, but the measurement accuracy becomes low because a moving body such as another vehicle exists between the feature to be measured and the vehicle at the time of the measurement (so-called occlusion).

(B) The estimated own vehicle position used to calculate the feature prediction value is deviated.

This is a case where the error of the predicted own vehicle position Xe(k) or the measurement updated own vehicle position Xp(k) is large.

(C) The position coordinates of the feature in the map data used for calculating the feature prediction value are deviated. This is the situation where the position of the feature is changed. For example, a road sign which is an example of a feature is inclined due to the collision by a vehicle, or a structure which is an example of a feature is removed or moved, after the map data is produced. Therefore, the position coordinates of the feature in the map data do not coincide with the actual position coordinates of the feature. Namely, the position of the feature in the map data and the position of the feature in real environment are deviated. Therefore, in this case, it is required to correct the position coordinates of the feature in the map data so as to coincide with the position coordinates of the real feature. In the embodiments, the position of such a feature is corrected in the following method.

Figure 11:
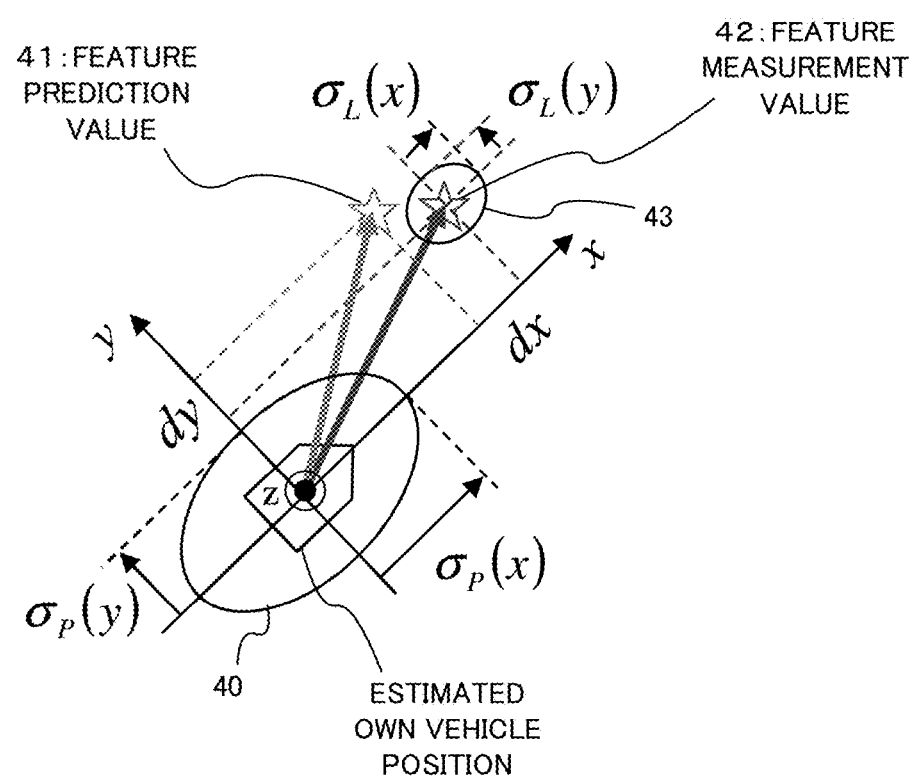
FIG. 11 illustrates a positional relation between the vehicle and the feature at the time of position estimation.

FIG. 11 illustrates a positional relation between the estimated own vehicle position and the feature. The coordinate system shown in FIG. 11 is a body coordinate system based on the vehicle, wherein the x-axis represents the traveling direction of the vehicle and the y-axis represents the direction perpendicular thereto (the left-right direction of the vehicle). The z-axis direction is the direction perpendicular to the paper of drawing, which represents the vertical direction of the vehicle. In FIG. 11, the estimated own vehicle position has the error range indicated by the error ellipse 40. The error ellipse 40 is defined by the position estimation accuracy $\sigma_P(x)$ in the x-direction, the position estimation accuracy $\sigma_P(y)$ in the y-direction and the position estimation accuracy $\sigma_P(z)$ in the z-direction. The position estimation accuracy $\sigma_P$ is obtained by converting the covariance matrix P(k) to the body coordinate system using Jacobian matrix H(i) by the following equation (7).

$$H(i)P(k)H(i)^T = \begin{bmatrix} \sigma_P(x)^2 & \text{Cov}(x, y) & \text{Cov}(x, z) \\ \text{Cov}(x, y) & \sigma_P(y)^2 & \text{Cov}(y, z) \\ \text{Cov}(x, z) & \text{Cov}(y, z) & \sigma_P(z)^2 \end{bmatrix} \quad (7)$$

In the equation (7), $\sigma_P(x)^2$ is the variance in the x-direction, $\sigma_P(y)^2$ is the variance in the y-direction and $\sigma_P(z)^2$ is the variance in the z-direction. As the square roots of them, the position estimation accuracy $\sigma_P(x)$ in the x-direction, the position estimation accuracy $\sigma_P(y)$ in the y-direction and the position estimation accuracy $\sigma_P(z)$ in the z-direction are calculated. Thus, the position estimation accuracy $\sigma_P(\sigma_P(x), \sigma_P(y), \sigma_P(z))$ is obtained.

In FIG. 11, the feature prediction value 41 is obtained by modeling the measurement processing by the Lidar 2 using predicted own vehicle position Xe(k) and the position vector of the feature registered in the map DB 13. The feature measurement value 42 is the measurement value by the Lidar 2 when the position vector of the feature registered in the map DB 13 and the scan data of the Lidar 2 can be associated with each other. The feature measurement value 42 has the error range indicated by the error ellipse 43. Generally, since the measurement error by the Lidar becomes large in proportion to the square of the distance between the Lidar and the feature to be measured, the Lidar measurement accuracy $\sigma_L(\sigma_L(x), \sigma_L(y), \sigma_L(z))$ is obtained by calculating the error ellipse 43 based on the distance from the estimated own vehicle position to the feature. The difference value between the feature prediction value 41 and the feature measurement value 42 is "dx" in the x-direction, "dy" in the y-direction and "dz" in the z-direction, as expressed by the equation (5).

Figure 12:
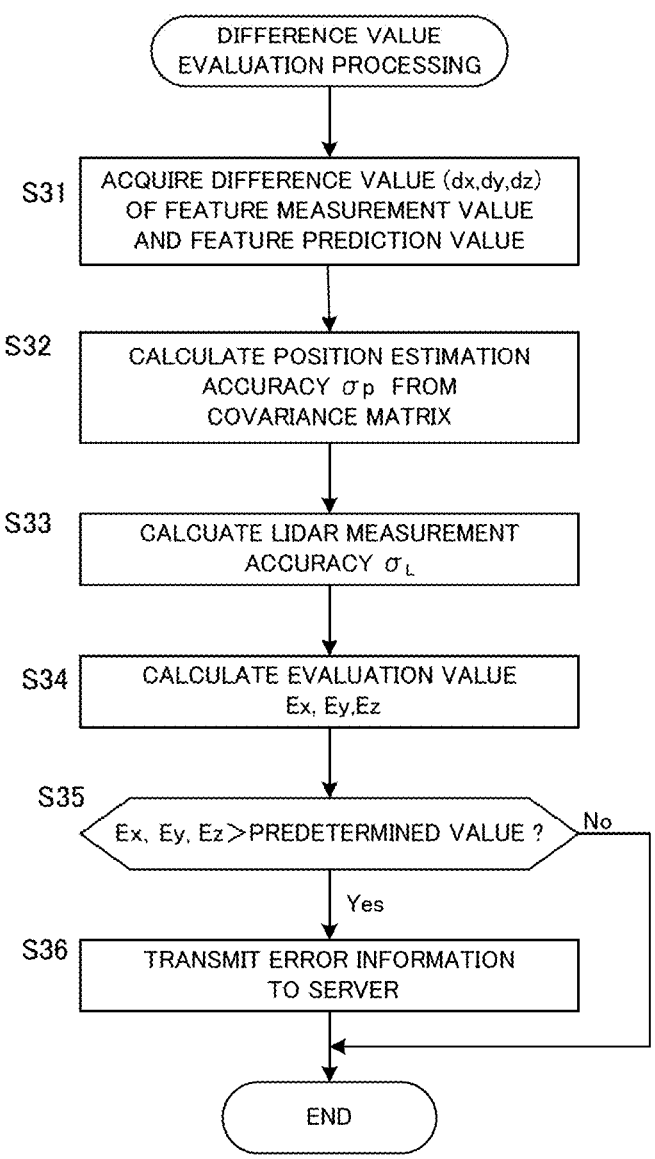
FIG. 12 is a flowchart of difference value evaluation processing according to a second embodiment.

FIG. 12 is a flowchart of the difference value evaluation processing executed by the onboard device 10 of the vehicle 1. This processing is actually performed by the control unit 15 of the onboard device 10 which executes a program prepared in advance. First, the onboard device 10 acquires the difference value (dx, dy, dz) of the feature measurement value 42 and the feature prediction value 41 by the above-mentioned equation (5) (step S31). Next, the onboard device 10 calculates the position estimation accuracy $\sigma_p$ by the equation (7) (step S32). Further, the onboard device calculates the Lidar measurement accuracy $\sigma_L$ based on the distance to the feature (step S33).

When the difference value (dx,dy,dz), the position estimation accuracy $\sigma_P(\sigma_P(x), \sigma_P(y), \sigma_P(z))$ and the Lidar measurement accuracy $\sigma_L(\sigma_L(x), \sigma_L(y), \sigma_L(z))$ are obtained, the onboard device 10 evaluates the difference value by using the position estimation accuracy and the Lidar measurement accuracy. Namely, the onboard device 10 examines the ratio of the difference value with respect to the error range 40 of the estimated own vehicle position and the Lidar error range 43, and determines the validity of the difference between the feature measurement value 42 and the feature prediction value 41. Specifically, the onboard device calculates the evaluation values Ex, Ey, Ez by the following evaluation equations (8) (step S34).

$$Ex = \frac{|dx|}{\sigma_P(x) + \sigma_L(x)} \quad (8)$$

$$Ey = \frac{|dy|}{\sigma_P(y) + \sigma_L(y)}$$

$$Ez = \frac{|dz|}{\sigma_P(z) + \sigma_L(z)}$$

Next, the onboard device 10 compares the evaluation values Ex, Ey, Ez with a predetermined value (step S35). When at least one of the evaluation values Ex, Ey, Ez is larger than the predetermined value (step S35: Yes), the onboard device 10 determines that the cause of the large difference value is the above-mentioned (A) or (C), i.e., the cause can be (C). Then, the onboard device 10 transmits the date and time information at that time, the estimated own vehicle position at that time, the feature ID of the object feature, the difference value (dy,dy,dz) the position estimation accuracy $\sigma_P(\sigma_P(x), \sigma_P(y), \sigma_P(z))$ and the Lidar measurement accuracy $\sigma_L(\sigma_L(x), \sigma_L(y), \sigma_L(z))$ to the server device 20 as the error information (step S36). Then, the processing ends. The reason why the date and time information is included in the error information to be transmitted to the server 20 is that, if the actual position coordinates of the feature changes due to the environmental change of the feature, the date and time information is important to know when the change occurred.

On the other hand, when all the evaluation values Ex, Ey, Ez are smaller than the predetermined value (step S35: No), the onboard device 10 ends the processing. In case of the above-mentioned (B), the denominators of the evaluation equations (8) are large, and the evaluation values Ex, Ey, Ez do not become large even if |dx|, |dy|, |dz| of the numerator are large. Thus, by the difference value evaluation processing, it is detected that the cause of the large difference value may be the above-mentioned (C), and the error information at that time is transmitted to the server device 20.

Figure 13:
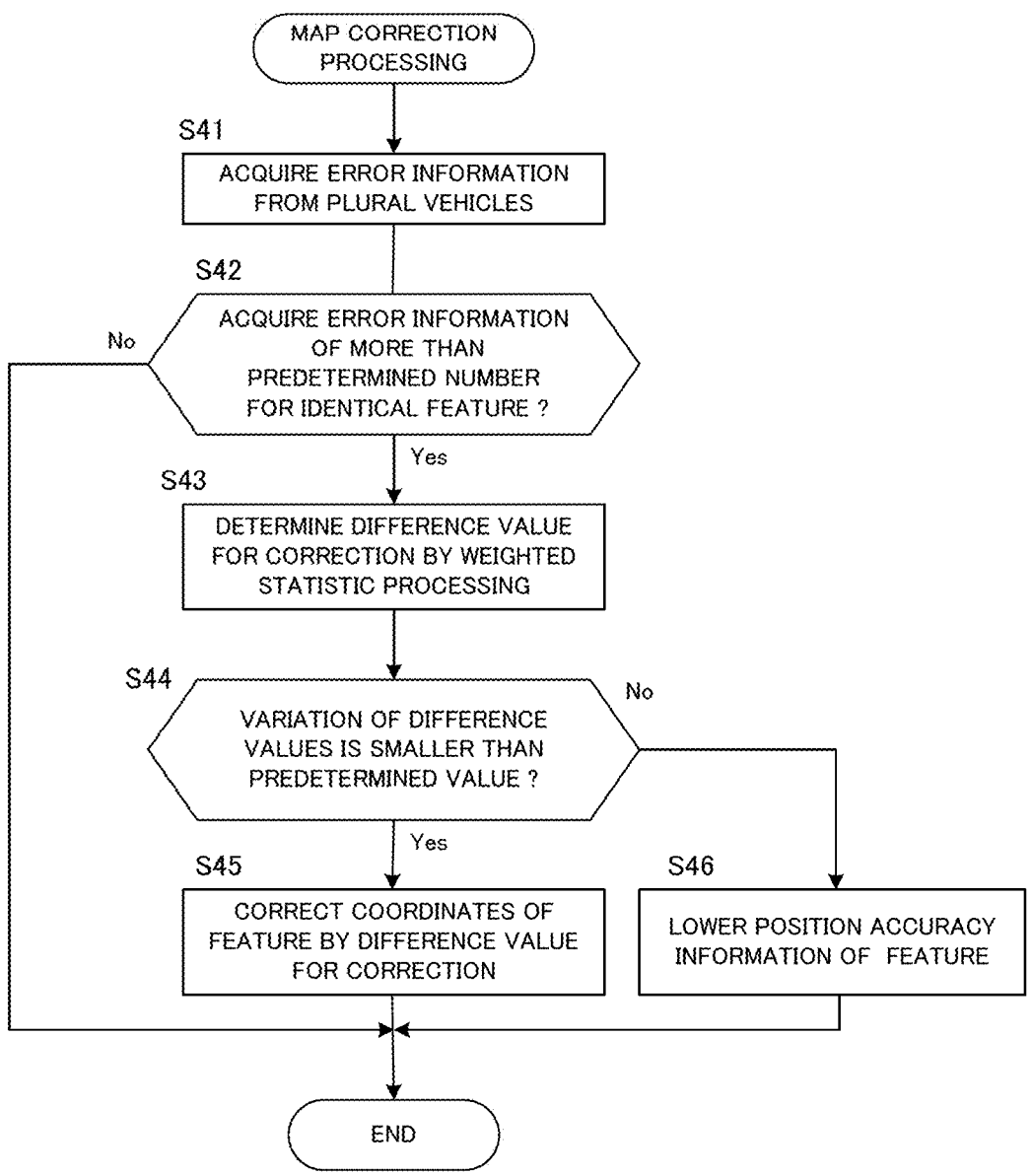
FIG. 13 is a flowchart of map correction processing according to the second embodiment.

Next, map correction processing performed by the server device 20 will be described. FIG. 13 is a flowchart of the map correction processing. This processing is actually performed by the controller 25 of the server device 20, which executes a program prepared in advance. First, the server device 20 acquires the error information from plural vehicles (step S41). Next, the server device 20 determines whether or not it acquired the error information of more than a predetermined number for the identical feature (step S42).

If the server device 20 did not acquire the error information of more than the predetermined number for the identical feature (step S42: No), the server device 20 determines that the cause of the large difference value on the vehicle side is (A), i.e., the difference value accidentally became large by occlusion or the like, and ends the processing.

On the other hand, if the server device 20 acquired the error information of more than the predetermined number for the identical feature (step S42; Yes), the server device 20 determines that the cause of the large difference value on the vehicle side is (C), i.e., the position coordinates of the feature in the map data do not coincide with the actual position coordinates of the feature. Since the difference value is the correction amount in the traveling direction, the left-right direction and the vertical direction of the vehicle on the body coordinate system shown in FIG. 11, the server device 20 converts the difference values (dx,dy,dz) included in the error information received from the plural vehicles 10 to the deviation amount on the map coordinate system. Then, the server device 20 determines the difference value for correction, indicating the correction amount of the feature position in the map data, by weighted statistic processing (step S43). Specifically, the server device 20 executes the statistic processing of the difference values by weighting based on the position estimation accuracy $\sigma_P$ and the Lidar measurement accuracy 61, of each vehicle included in the error information received from the onboard devices 10. For example, the server device 20 determines that the error information in which the sum of the position estimation accuracy $\sigma_P$ and the Lidar measurement accuracy $\sigma_L$ is small has high accuracy, and increases the weight for the error information. Thus, the server device 20 determines the difference value for correction.

In the above processing, the server device 20 determines that the cause of the large difference value is (A) if it did not acquire the error information of more than the predetermined number for the identical feature (step S42: No), and determines that the cause of the large difference value is (C) if it acquired the error information of more than the predetermined number for the identical feature (step S42: Yes). However, it is possible that the server device 20 do not determine the cause of the large difference value as (A) or (C). Namely, if the server device 20 did not acquire the error information of more than the predetermined number for the identical feature (step S42: No), the server device 20 may end the processing. If the server device 20 acquired the error information of more than the predetermined number for the identical feature (step S42: Yes), the server device 20 may convert the difference values (dx,dy,dz) included in the error information received from the plural onboard devices 10 to the deviation amounts on the map coordinate system, and determine the difference value for correction, indicating the correction amount of the feature position in the map data, by the weighted statistic processing (step S43).

Next, the server device 20 determines whether or not the variation of the difference values is smaller than a predetermined value during calculation of the difference value for correction (step S44). If the variation of the difference values is smaller than the predetermined value (step S44: Yes), the server device corrects the position coordinates of the feature in the map data by the difference value for correction (step S45). Since the difference value for correction is the correction amount in the traveling direction, the left-right direction and the vertical direction of the vehicle on the body coordinate system shown in FIG. 11, the server device 20 converts it to the deviation amount on the map coordinate system, and then corrects the position coordinates of the feature in the map data. Thus, based on the error information acquired from plural vehicles, the position coordinates of the feature in the map data are corrected. Since the difference value for correction used here is calculated by the weighted statistic processing of the difference values included in the error information acquired from plural onboard devices 10 using the position estimation accuracy and the Lidar measurement accuracy, the position coordinates in the map data can be corrected without the influence of the position estimation accuracy and the Lidar measurement accuracy in each onboard device 10.

On the other hand, if the variation of the difference values is not smaller than the predetermined value (step S44: No), it is difficult to accurately determine the correction amount of the position coordinates of the feature in the map data, and the server device 20 lowers the position accuracy information of the feature in the map data (step S46). Namely, the server device 20 assigns, to the feature in the map data, information indicating that the position accuracy is low. Then, the processing ends. Thus, the onboard device 10 can recognize that the position accuracy of the feature is low when using the information of the feature in the map data, and the onboard device 10 can use the information of the feature with lower weight or avoid the use of the information in the own vehicle position estimation processing. Actually, such a feature is measured again by a dedicated measurement vehicle or the like. However, by assigning the information indicating that the position accuracy is low, it can be prevented that the onboard device 10 on the vehicle 1 side uses the information of low position accuracy for the driving support or the autonomous driving.

Concrete Example

Next, effect of the own vehicle position estimation processing based on the above embodiments will be described.

Figure 14A:
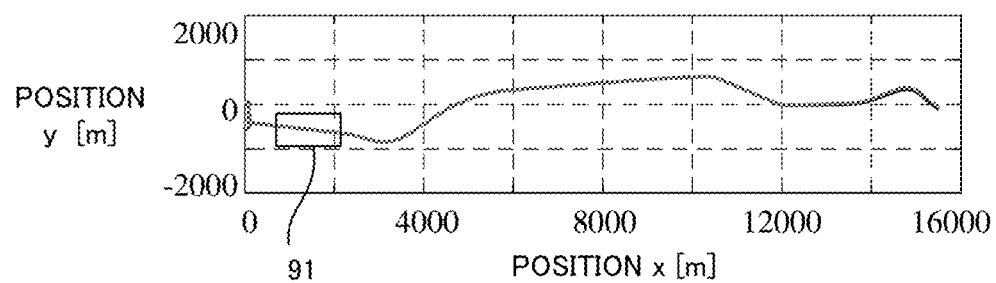
FIGS. 14A to 14D are diagrams explaining effect by the embodiments.
Figure 14B:
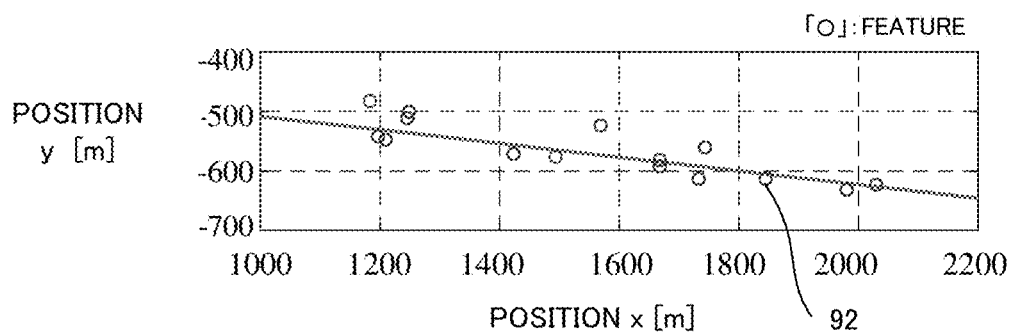
Figure 14C:
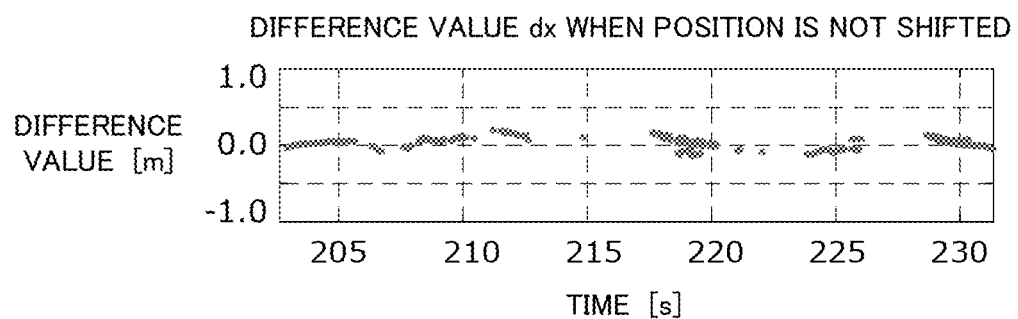

FIG. 14A is a graph showing transition of the position in the x-direction and the y-direction when a vehicle runs on a certain running test course with executing the own vehicle position estimation processing according to the embodiments. FIG. 14B is a magnified view of the graph in the traveling section in the window 91 in FIG. 14A. In FIG. 14B, the positions of the features measured are plotted by small circles. FIG. 14C is a graph showing transition of the difference value dx in the traveling section of the window 91. The difference value dx has a value near zero ("0").

Figure 14D:
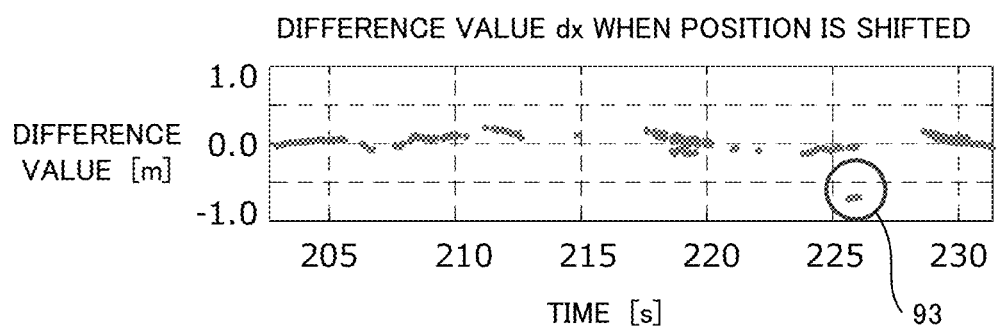

Here, as a simulation, the position of the feature indicated by the reference 92 in FIG. 14B is arbitrarily shifted by 80 cm forward, and the own vehicle position estimation processing is executed. As a result, the difference value dx=0.749 [m] is calculated. FIG. 14D shows transition of the difference value dx in the traveling section of the window 91 obtained at that time. As shown by the circle 93, at the time when the feature of the reference 92 arbitrarily shifted is detected, the difference value close to the shift of the feature is obtained.

At the time when the feature of the reference 92 shifted is detected, the following numerical values are obtained:

Difference value in the x-direction dx=0.749 [m]

Own vehicle position estimation accuracy $\sigma_P(x)$=0.048 [m]

Lidar measurement accuracy $\sigma_L(x)$=0.058 [m]

Using the above values, the evaluation value Ex is calculated as follows by the equation (8):

$$E_x = \frac{|dx|}{\sigma_P(x) + \sigma_L(x)} = \frac{0.749}{0.048 + 0.058} = 7.066 > \text{PREDETERMINED VALUE} \qquad (9)$$

The evaluation value Ex=7.066. For example, when the predetermined value=1, the difference value dx is determined to be a sufficiently large deviation amount, and the difference value dx=−0.749 [m] is uploaded to the server device 20.

As understood from this simulation result, by the own vehicle position estimation processing, a value close to the position shift of the feature is calculated. Therefore, if the server device 20 collects the data from plural vehicles, it is possible to calculate the numerical value close to the real deviation amount of the feature position.

MODIFIED EXAMPLES

Modified examples suitable for the embodiments will be described below. The following modified examples may be applied to the embodiments in combination.

1st Modified Example

Figure 15:
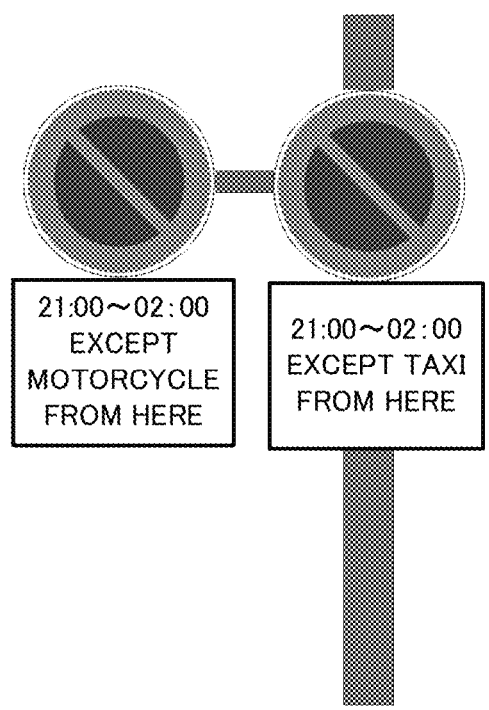
FIG. 15 shows an example of plural road signs placed side by side.

In the above embodiments, when the difference value between the feature measurement value and the feature prediction value is large, it is determined that position coordinates of the feature in the map data do not coincide with the actuation position coordinates. However, actually, there may be a case where the difference value becomes large due to the kind or shape of the feature even if the position coordinates of the feature in the map data are correct. For example, when a road sign is used as the feature, if plural road signs exist side by side as shown in FIG. 15, the onboard device 10 may detect them as a single feature. Although the feature prediction value calculated based on the map data discriminates those two road signs, if the feature measurement value cannot discriminate those two road signs, the difference value becomes large.

In such a case, the vehicle 1 carrying a camera transmits the error information including images captured by the camera to the server device 20. In this case, since the position coordinates of the feature in the map data are correct, it is not necessary to correct the position coordinates. However, it can be said that this feature is easy to cause mistake when it is used in the own vehicle position estimation. Therefore, the server device 20 analyzes the captured image by image recognition using Artificial Intelligence (AI), for example. When the server device 20 determines that the feature is easy to cause mistake, the server device 20 adds information (e.g., unrecommended flag) indicating that using the feature in the position estimation is not recommended. Thus, the onboard device 10 of the vehicle 1 can take a measure to avoid positive use of the feature with the unrecommended flag in the position estimation processing.

Figure 16A:
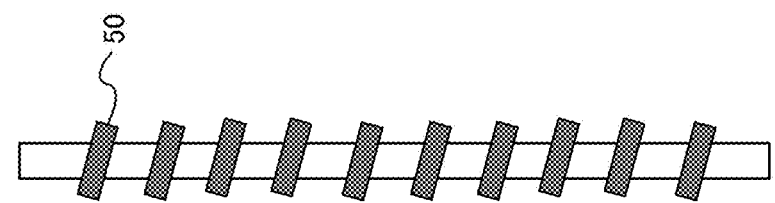
FIGS. 16A to 16D are examples of complex white lines and a white line with road studs.
Figure 16B:
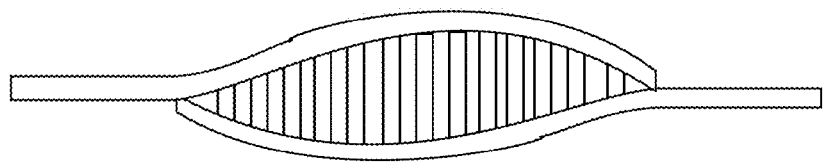
Figure 16C:
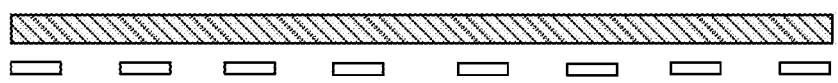
Figure 16D:
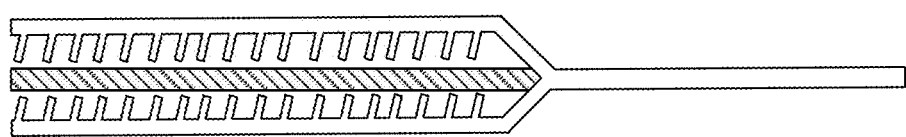

The same thing can happen when road paint such as a white line is used as the feature. Even clearly-drawn road paint may cause matching error when it is collated with the detection result by the Lidar. For example, complex white lines as shown in FIGS. 16A to 16C and a white line with road studs as shown in FIG. 16D require processing of determining the center of the white line for the Lidar measurement data. By a method of simply identifying the Lidar detection data by reflectivity, the white line becomes thick or distorted, and accurate matching cannot be performed.

Therefore, when the onboard device 10 of the vehicle 1 detects a place where the difference value is large at the time of the matching of the Lidar detection data and the map data, the onboard device 10 includes that information to the error information, and transmits the error information to the server device 20. The server device 20 collects the error information from plural vehicles 1, and adds information indicating whether or not the matching of the feature (the road paint) is easy. Also, by referring to this information, the onboard device 10 of the vehicle 1 may take measure to lower the weight of the feature or avoid use of the feature in the position estimation.

2nd Modified Example

In the above embodiments, the difference value evaluation processing for evaluating the difference value is performed on the side of the onboard device 10 of the vehicle 1, and the map correction processing is performed on the side of the server 20. Instead, the onboard device 10 may transmit data related to all the features to the server device 20, and the server device 20 may execute the difference value evaluation processing and the map correction processing. Specifically, the onboard device 10 transmits all the error information (including the date and time information, the estimated own vehicle position, the feature ID, the difference value, the position estimation accuracy and the Lidar measurement accuracy) to the server device 20 without performing the evaluation by the evaluation values Ex, Ey, Ez. The server device 20 may first calculate the evaluation values Ex, Ey, Ez using the received error information, and then perform the map correction processing shown in FIG. 8 or FIG. 13 for the error information whose evaluation values Ex, Ey, Ez exceed a predetermined value.

3rd Modified Example

Conversely, the difference value evaluation processing and the map correction processing may be executed on the side of the onboard device 10 of the vehicle 1. In this case, the onboard device 10 first executes the difference value evaluation processing shown in FIG. 7 or FIG. 12 to generate the error information, and stores the error information in the storage unit 12. When the vehicle runs the same place plural times, plural error information for the same feature are obtained. Therefore, the onboard device executes the map correction processing shown in FIG. 8 or FIG. 13 using the plural error information for the same feature, which is stored in the storage unit 12. Namely, instead of using error information acquired from plural vehicles, plural error information acquired by traveling of plural times by the own vehicle are used. Thus, for the features stored in the map DB 13, the onboard device 10 performs correction using the difference value for correction, or executes processing of lower the position accuracy information. Also, the map data thus corrected may be transmitted to the server device 20, if necessary.

4th Modified Example

As the evaluation equations, the following equations (10) may be used instead of the above-mentioned equations (8).

$$Ex = |dx| - (\sigma_P(x) + \sigma_L(x))$$
$$Ey = |dy| - (\sigma_P(y) \pm \sigma_L(y))$$
$$Ez = |dz| - (\sigma_P(z) + \sigma_L(z)) \quad (10)$$

5th Modified Example

By adding a distance measurement value to an object to the estimated own vehicle position, the position of the object based on the measurement may be calculated. Then, the position of the object calculated based on the measurement and the position of the object in the map information may be compared to determine whether or not the deviation amount exists.

6th Modified Example

In the above embodiments, the server device 20 collects the error information from the onboard devices 10. However, when the vehicle measures a certain feature plural times, the onboard device 10 may calculate a weighted average and variance for the difference values (dy, dy) of plural times, and transmit the error information to the server device 20 if the variance value is small.

Specifically, if the cause the state that the evaluation values Ex, Ey are larger than a predetermined value and the difference value becomes large is not "(B) The estimated own vehicle position used to calculate the feature prediction value is deviated", the onboard device 10 calculates a weighted average and variance for the difference values (dx,dy) calculated N-times using the position estimation accuracy $\sigma_P(\sigma_P(x), \sigma_P(y))$ and the Lidar measurement accuracy $\sigma_L(\sigma_L(x), \sigma_L(y))$. Namely, the onboard device performs calculation with making the weight of accurate (dx,dy) large and making the weight of inaccurate (dx,dy) small.

The weighted average of the difference values dx is calculated by the following equation (11). Also, the weighted average of the difference values dy is calculated by the equation similar to the equation (11) and related to the difference dy, i.e., the equation in which "x" is replaced with "y" in the equation $$\overline{dx} = \frac{\left(\frac{1}{\sigma_{P1}(x)^2} + \frac{1}{\sigma_{L1}(x)^2}\right)dx_1 + \left(\frac{1}{\sigma_{P2}(x)^2} + \frac{1}{\sigma_{L2}(x)^2}\right)dx_2 + \ldots + \left(\frac{1}{\sigma_{PN}(x)^2} + \frac{1}{\sigma_{LN}(x)^2}\right)dx_N}{\left(\frac{1}{\sigma_{P1}(x)^2} + \frac{1}{\sigma_{L1}(x)^2}\right) + \left(\frac{1}{\sigma_{P2}(x)^2} + \frac{1}{\sigma_{L2}(x)^2}\right) + \ldots + \left(\frac{1}{\sigma_{PN}(x)^2} + \frac{1}{\sigma_{LN}(x)^2}\right)} \quad (11)$$

$$= \frac{\sum_{j=1}^{N}\left(\frac{1}{\sigma_{Pj}(x)^2} + \frac{1}{\sigma_{Lj}(x)^2}\right)dx_j}{\sum_{j=1}^{N}\left(\frac{1}{\sigma_{Pj}(x)^2} + \frac{1}{\sigma_{Lj}(x)^2}\right)}$$

The variance of the difference values dx is calculated by the following equation (12). Also, the variance of the difference values dy is calculated by the equation similar to the equation (12) and related to the difference dy, i.e., the equation in which "x" is replaced with "y" in the equation (12).

$$\mathrm{Var}(dx) = \frac{\sum_{j=1}^{N}\left(\frac{1}{\sigma_{Pj}(x)^2} + \frac{1}{\sigma_{Lj}(x)^2}\right)(dx_j - \overline{dx})^2}{(N-1)\sum_{j=1}^{N}\left(\frac{1}{\sigma_{Pj}(x)^2} + \frac{1}{\sigma_{Lj}(x)^2}\right)} \quad (12)$$

In this calculation result, if the variance is large, it is understood that the difference values have large variance. Therefore, it is highly possible that the cause of the large difference value is "(A) The feature measurement value has an error.", and the onboard device 10 ends the processing without transmitting the error information to the server device 20. On the other hand, if the variance is small, it is understood that the difference values have small variance. Therefore, it is highly possible that the cause of the large difference value is "(C) The position coordinates of the feature in the map data used for calculating the feature prediction value is deviated.", and the onboard device transmits the weighted average value of the difference values (dx, dy) and the accuracy of the weighted average value to the server device 20.

The accuracy of the weighted average value of the difference values dx is calculated by the following equation (13). Also, the accuracy of the weighted average value of the difference values dy is calculated by the equation similar to the equation (13) and related to the difference dy, i.e., the equation in which "x" is replaced with "y" in the equation (13).

$$\sigma(\overline{dx}) = \sqrt{\frac{1}{\left(\frac{1}{\sigma_{P1}(x)^2} + \frac{1}{\sigma_{L1}(x)^2}\right) + \left(\frac{1}{\sigma_{P2}(x)^2} + \frac{1}{\sigma_{L2}(x)^2}\right) + \ldots + \left(\frac{1}{\sigma_{PN}(x)^2} + \frac{1}{\sigma_{LN}(x)^2}\right)}} \quad (13)$$

$$= \sqrt{\frac{1}{\sum_{j=1}^{N}\left(\frac{1}{\sigma_{Pj}(x)^2} + \frac{1}{\sigma_{Lj}(x)^2}\right)}}$$

The onboard device 10 may transmit the difference value (dx, dy), the position estimation accuracy $\sigma_P(\sigma_P(x), \sigma_P(y))$ and the Lidar measurement accuracy $\sigma_L(\sigma_L(x), \sigma_L(y))$ for N-times to the server device 20, and the server device 20 may calculate the weighted average and the variance, determine (A) and (C) and calculate the accuracy of the weighted average value using the above equations.

By performing this processing, the onboard device 10 transmits the data for the case where the cause of the large difference value is "(C) The position coordinates of the feature in the map data used for calculating the feature prediction value is deviated.". Therefore, frequency of transmitting data from the onboard device 10 to the server device 20 may be reduced, and the processing in the server device 20 may be diminished.

Further, the server device 20 may determine whether or not the onboard device 10 executes the above processing, and if the above processing needs to be executed, the server device 20 may transmit request information to execute the above processing to the onboard device 10. Specifically, the server device 20 determines whether or not it is necessary to examine the position of the feature stored in the map DB 13 based on the final updating date and/or the accuracy of the map information. When the examination of the position of the feature is necessary, the server device 20 does not transmit the above-mentioned request information to execute the processing, and the onboard device 10 transmits the error information to the server device 20. On the other hand, when the examination of the position of the feature is not necessary, the server device 20 transmits the above-mentioned request information to execute the processing. Thus, it becomes possible to perform processing in accordance with necessity of the examination for each feature.

BRIEF DESCRIPTION OF REFERENCE NUMBERS

1 Vehicle
2 Lidar
3 Gyro sensor
4 Vehicle speed sensor

5 GPS receiver
10 Onboard device
13 Map DB
15, 25 Control unit
20 Server device
23 Map DB

The invention claimed is:

1. A determination device comprising:
a processor coupled to a memory storing instructions to permit the processor to function as:
a first acquisition unit configured to acquire a first distance information measured by a measurement unit and indicating a distance from a movable body to an object, and a second distance information estimated by an estimation unit and indicating the distance from the movable body to the object;
a second acquisition unit configured to acquire measurement accuracy information indicating measurement accuracy of a position of the object by the measurement unit and estimation accuracy information indicating estimation accuracy of a position of the movable body by the estimation unit; and
a determination unit configured to determine presence or absence of deviation larger than a predetermined value between a position of the object in map information and the position of the object in real environment, based on a difference value of the distances indicated by the first distance information and the second distance information, the measurement accuracy information, and the estimation accuracy information,
wherein the processor corrects position coordinates of the object in the map information to coincide with position coordinates of the object in the real environment based on the presence or absence of the deviation.

2. The determination device according to claim 1, wherein the processor further functions as:
a third acquisition unit configured to acquire error information including the difference value, the estimation accuracy information and the measurement accuracy information for the object which is determined to have the deviation larger than the predetermined value; and
a correction unit configured to correct the position of the object in the map information by statistic processing of the difference value included in the acquired error information when the third acquisition unit acquires the error information of more than a predetermined number for an identical object.

3. The determination device according to claim 2, wherein the correction unit converts the difference value from a movable body coordinate system to a map coordinate system to correct the position in the map information.

4. The determination device according to claim 2, wherein the correction unit lowers a level of the estimation accuracy information assigned to the object in the map information when variation of the difference value included in the acquired error information is larger than the predetermined value, in a case where the third acquisition unit acquires the error information from vehicles of more than the predetermined number for the identical object.

5. The determination device according to claim 2, wherein the error information includes date and time information and identification information of the object.

6. The determination device according to claim 1, wherein the determination device is loaded on a vehicle, and
wherein the determination device further comprises a transmission unit configured to transmit error information including the difference value, the estimation accuracy information and the measurement accuracy information to an external server, when the determination unit determines the presence of the deviation larger than the predetermined value.

7. The determination device according to claim 6, wherein the transmission unit transmits plural error information or information obtained by using the plural error information to the external server when a variance value based on the plural error information is smaller than another predetermined value, in a case where the third acquisition unit acquires the plural error information for the identical object.

8. The determination device according to claim 1, wherein the measurement unit and the estimation unit are loaded on a vehicle,
wherein the determination device is provided in a server, and
wherein the first acquisition unit acquires the first distance information and the second distance information from the vehicle.

9. A determination method executed by a determination device, the determination method comprising:
a first acquisition process to acquire a first distance information measured by a processor and indicating a distance from a movable body to an object, and a second distance information estimated by the processor and indicating the distance from the movable body to the object;
a second acquisition process to acquire measurement accuracy information indicating measurement accuracy of a position of the object by the processor and estimation accuracy information indicating estimation accuracy of a position of the movable body by the processor; and
a determination process to determine presence or absence of deviation larger than a predetermined value between a position of the object in map information and the position of the object in real environment, based on a difference value of the distances indicated by the first distance information and the second distance information, the measurement accuracy information, and the estimation accuracy information,
wherein the processor corrects position coordinates of the object in the map information to coincide with position coordinates of the object in the real environment based on the presence or absence of the deviation.

10. A non-transitory computer-readable medium storing a program executed by a determination device including a processor of a computer, the program causing the processor of the computer to function as:
a first acquisition unit configured to acquire a first distance information measured by a measurement unit and indicating a distance from a movable body to an object, and a second distance information estimated by an estimation unit and indicating the distance from the movable body to the object;
a second acquisition unit configured to acquire measurement accuracy information indicating measurement accuracy of a position of the object by the measurement unit and estimation accuracy information indicating estimation accuracy of a position of the movable body by the estimation unit; and
a determination unit configured to determine presence or absence of deviation larger than a predetermined value between a position of the object in map information and the position of the object in real environment, based on a difference value of the distances indicated by the first distance information and the second distance information, the measurement accuracy information, and the estimation accuracy information, wherein the processor corrects position coordinates of the object in the map information to coincide with position coordinates of the object in the real environment based on the presence or absence of the deviation.

11. A determination device comprising:

a processor coupled to a memory storing instructions to permit the processor to function as:

a first acquisition unit configured to acquire a first distance information measured by a measurement unit and indicating a distance from a movable body to an object, and a second distance information estimated by an estimation unit and indicating the distance from the movable body to the object;

a second acquisition unit configured to acquire measurement accuracy information indicating measurement accuracy of a position of the object by the measurement unit and estimation accuracy information indicating estimation accuracy of a position of the movable body by the estimation unit; and a determination unit configured to determine presence or absence of deviation larger than a predetermined value between a position of the object in map information and the position of the object based on the first distance information, based on a difference value of the distances indicated by the first distance information and the second distance information, the measurement accuracy information, and the estimation accuracy information, wherein the processor corrects position coordinates of the object in the map information to coincide with position coordinates of the object in the real environment based on the presence or absence of the deviation.

* * * * *